United States Patent
Shin et al.

(10) Patent No.: US 11,197,137 B2
(45) Date of Patent: Dec. 7, 2021

(54) ELECTRONIC DEVICE AND METHOD FOR REMOTELY PROVIDING PROFILE TO ELECTRONIC DEVICE

(71) Applicant: SAMSUNG ELECTRONICS CO., LTD., Suwon-si (KR)

(72) Inventors: Eung-Seo Shin, Seoul (KR); Dhiraj Jha, Seoul (KR); Jae-Hyeon Seo, Yongin-si (KR); Sang-Hwi Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/641,664

(22) PCT Filed: Aug. 20, 2018

(86) PCT No.: PCT/KR2018/009528
§ 371 (c)(1),
(2) Date: Feb. 25, 2020

(87) PCT Pub. No.: WO2019/039813
PCT Pub. Date: Feb. 28, 2019

(65) Prior Publication Data
US 2020/0228969 A1    Jul. 16, 2020

(30) Foreign Application Priority Data
Aug. 25, 2017   (KR) ........................ 10-2017-0108241

(51) Int. Cl.
*H04W 4/60*       (2018.01)
*H04W 8/24*       (2009.01)
(Continued)

(52) U.S. Cl.
CPC ........... *H04W 4/60* (2018.02); *H04L 63/0869* (2013.01); *H04W 4/50* (2018.02); *H04W 8/18* (2013.01);
(Continued)

(58) Field of Classification Search
CPC ......... H04W 4/50; H04W 4/60; H04W 8/245; H04W 8/205; H04W 12/06; H04W 88/00–06; H04W 92/08; H04L 63/0869
See application file for complete search history.

(56) References Cited

U.S. PATENT DOCUMENTS 9,549,313  B2    1/2017  Park et al.
2009/0144811  A1*  6/2009  Matsubara ....... H04N 21/47202
                                                                726/5
(Continued)

FOREIGN PATENT DOCUMENTS

EP          2 858 393        3/2017
KR    10-2013-0006257        1/2013
WO       2016/091414         6/2016

OTHER PUBLICATIONS

International Search Report for PCT/KR2018/009528 dated Nov. 21, 2018, 10 pages.
(Continued)

*Primary Examiner* — San Htun
(74) *Attorney, Agent, or Firm* — Nixon Vanderhye, P.C.

(57) ABSTRACT

An example electronic device includes a communication interface; an embedded subscriber identity module; a processor electrically connected to the communication interface and the embedded subscriber identity module; and memory electrically connected to the processor. The memory, if during execution the processor determines the type of subscriber identification information stored in the embedded subscriber identity module and the subscriber identification information is the shared subscriber identification information according to the determination result, confirms at least one communication service providing server connectable in the electronic device among a plurality of communication service providing servers, and can store instructions for accessing a communication service providing server
(Continued)

selected from at least one communication service providing server with has been confirmed, by means of the communication interface.

7 Claims, 17 Drawing Sheets

(51) Int. Cl.
   *H04W 8/18* (2009.01)
   *H04W 60/00* (2009.01)
   *H04L 29/06* (2006.01)
   *H04W 8/20* (2009.01)
   *H04W 12/06* (2021.01)
   *H04W 4/50* (2018.01)

(52) U.S. Cl.
   CPC .......... *H04W 8/205* (2013.01); *H04W 8/245* (2013.01); *H04W 12/06* (2013.01); *H04W 60/005* (2013.01)

(56) References Cited

U.S. PATENT DOCUMENTS

| | | | |
|---|---|---|---|
| 2010/0311468 A1* | 12/2010 | Shi | .......................... H04W 4/50 455/558 |
| 2012/0307844 A1* | 12/2012 | Bollapalli | ............. H04J 3/0638 370/503 |
| 2013/0065572 A1* | 3/2013 | Brisebois | .............. H04W 88/06 455/418 |
| 2013/0237215 A1 | 9/2013 | Vashi et al. | |
| 2014/0045460 A1* | 2/2014 | Park | ........................ H04W 4/60 455/411 |
| 2015/0237551 A1 | 8/2015 | Jin et al. | |
| 2015/0382178 A1* | 12/2015 | Park | ....................... H04W 8/183 455/411 |
| 2016/0088467 A1* | 3/2016 | Reddem | ................ H04W 12/04 455/418 |
| 2016/0174069 A1* | 6/2016 | Bruner | .................... H04W 8/18 455/411 |
| 2016/0205546 A1 | 7/2016 | Poon et al. | |
| 2016/0246611 A1 | 8/2016 | Li et al. | |
| 2016/0277051 A1 | 9/2016 | Yang | |
| 2016/0337780 A1 | 11/2016 | Li et al. | |

OTHER PUBLICATIONS

Written Opinion of the ISA for PCT/KR2018/009528 dated Nov. 21, 2018, 5 pages.

Office Action dated Jun. 21, 2021 in counterpart Korean Patent Application No. 10-2017-0108241 and English-language translation.

* cited by examiner

ELECTRONIC DEVICE AND METHOD FOR REMOTELY PROVIDING PROFILE TO ELECTRONIC DEVICE

This application is a National Phase Entry of PCT international Application No. PCT/KR2018/009528, which was filed on Aug. 20, 2018, and claims priority to Korean Patent Application No. 10-2017-0108241 filed on Aug. 25, 2017, in the Korean Intellectual Property Office, the contents of which are incorporated herein by reference.

TECHNICAL FIELD

The disclosure relates to an electronic device that may provide a profile to an electronic device in which an embedded subscriber identity module (eSIM) is disposed, and a method of remotely providing a profile to an electronic device.

BACKGROUND ART

In a wireless communication system, a user equipment (UE) is capable of using a voice communication or data communication service by accessing a wireless communication network at a predetermined location or while moving. In order to provide a communication service to the UE, an appropriate authentication process may be needed. Generally, a universal integrated circuit card (UICC) is inserted into the UE, and a universal subscriber identity module (USIM) installed in the UICC is used when authentication between the UE and the server of a common carrier (a mobile network operator (MNO)) is performed. The UICC may be referred to as a subscriber identity module (SIM) card in the case of global system for mobile communications (GSM), and may be referred to as a universal subscriber identity module (USIM) card in the case of wideband code division multiple access (WCDMA) or long term evolution (LTE).

If the user of the UE subscribes to a wireless communication service that the MNO provides, the MNO provides a UICC to the user. If the user inserts the UICC to the UE, a USIM application installed in the UICC uses a K value, which is an encryption key for authentication, and an international mobile subscriber identity (IMSI) value stored in the UICC so as to perform an appropriate authentication process with the MNO server that stores the same values, and thus, the user is capable of using wireless communication service. An example of the appropriate authentication process may include authentication and key agreement (AKA).

In a process of manufacturing the UICC, the UICC is manufactured as a card dedicated to a predetermined MNO by request from the corresponding MNO, and authentication information (e.g., an USIM application and subscriber identification (ID) (e.g., IMSI)) and an encryption key (e.g., a publically known K or Ki value) used for accessing the network of the corresponding MNO may be contained in advance. The UICC is provided from the corresponding MNO to a subscriber of the communication service, and the MNO may manage an application in the UICC, such as installing, correcting, deleting, or the like of an application, by using a technology such as over the air (OTA) or the like. The user may insert the UICC into the UE, and may use the network and application service of the corresponding MNO. When the user changes the UE, the user may insert the UICC detachable from the existing UE into a new UE, and may use authentication information, phone numbers, a personal phone book, and the like stored in the corresponding UICC in the new UE, as they are.

Unlike a UICC that is manufactured and distributed as a UICC dedicated to a predetermined MNO, a user may subscribe to (or purchase) a communication service after purchasing a predetermined UICC or obtaining the UICC, a user may subscribe to and cancel a predetermined MNO, or may subscribe to another MNO different from the existing MNO. Accordingly, a scheme of remotely installing an USIM application of an MNO, a subscriber ID, an encryption key, and the like in the UICC, and safely and flexibly installing and managing authentication information of various MNOs is being actively studied.

For example, research on an embedded UICC (eUICC) is ongoing, which is capable of remotely installing a profile for providing a communication service, via a network, as opposed to changing a UICC, when a user changes an MNO. The eUICC may be manufactured as a pre-loaded UICC which is fixedly embedded in a UE in the form of a chip when the UE is manufactured. Therefore, the eUICC may be used for various UEs which may have structures that do not physically allow ease detachment of a UICC, such as a machine to machine (M2M) UE or device to device (D2D) UE, as well as a normal wireless UE such as a mobile phone. The eUICC may be also referred to as an eSIM.

In order to install a profile by the eUICC, initial network access (initial connectivity) is needed. To support the initial network access, a user needs to visit an MNO shop, so as to separately purchase a quick response (QR) code-based voucher including an activation code, which is inconvenient.

As another example, when a user equipment (UE) is released, if an eUICC includes a provisioning profile, instead of using the QR code, a user may have difficulty to determine a location and a network to be used for downloading an operational profile via the UE that the user purchases. Furthermore, the user may have difficulty to perform initial network access for downloading the operational profile or the provisioning profile.

SUMMARY

Various embodiments of the disclosure may provide an electronic device that provides initial network access to a UE equipped with an eUICC to support downloading a profile from a corresponding server and a method of remotely providing a profile to an electronic device.

In accordance with an aspect of the disclosure, an electronic device may include: a communication interface; an embedded subscriber identification module configured to store shared subscriber identification information which is usable by accessing at least one communication service provision server; a processor electrically connected to the communication interface and the embedded subscriber identification module; and a memory electrically connected to the processor, wherein the memory includes instructions that when executed enable the processor to: determine a type of subscriber identification information stored in the embedded subscriber identification module; if a result of determination indicates that the subscriber identification information is the shared subscriber identification information, determine at least one communication service provision server to which the electronic device is connectable, from among a plurality of communication service provision servers; and access a communication service provision server selected from the at least one communication service provision server, via the communication interface.

In accordance with an aspect of the disclosure, an electronic device may include: a network interface; an embedded subscriber identification module configured to store shared subscriber identification information which is usable by accessing at least one communication service provision server; a processor electrically connected to the network interface; and a memory electrically connected to the processor, wherein the memory includes instructions that when executed enable the processor to: identify the shared subscriber identification information stored in the embedded subscriber identification module; transmit the identified shared subscriber identification information to a first server via at least one communication service provision server to which the electronic device is connectable from among a plurality of communication service provision servers; receive access information associated with a second server that provides a provisioning profile, from the first server, in response to the transmission of the shared subscriber identification information; and request the provisioning profile from the second server, on the basis of the received access information associated with the second server.

In accordance with an aspect of the disclosure, a method of remotely providing a profile to an electronic device, may include: determining whether subscriber identification information stored in a subscriber identification module embedded in the electronic device is shared subscriber identification information which is usable by accessing a communication service provision server; transmitting the shared subscriber identification information to a first server, via at least one communication service provision server to which the electronic device is connectable from among a plurality of communication service provision servers; receiving, from the first server, access information associated with a second server that provides a provisioning profile in response to the transmission of the shared subscriber identification information; and requesting the provisioning profile from the second server, on the basis of the received access information associated with the second server.

In accordance with an aspect of the disclosure, a system may include: a network interface; a memory storing access information associated with a provisioning profile provision server that provides a provisioning profile corresponding to each communication service provision server; and a processor electrically connected to the network interface and the memory. The memory may store instructions that may control the processor to: receive an access information request message associated with the provisioning profile provision server from at least one electronic device via the network interface, identify subscriber identification information included in the received message, and transmit, to the at least one electronic device, access information associated with the provisioning profile provision server stored in the memory via the network interface, if the identified subscriber identification information is shared subscriber identification information which is usable by accessing at least one communication service provision server.

An electronic device and a method of remotely providing a profile to an electronic device, according to various embodiments, may enable an electronic device including an eUICC that is incapable of performing initial network access to perform initial network access using shared subscriber identification information which is usable by accessing at least one communication service provision server (or an MNO server) and may remotely provide a profile.

DETAILED DESCRIPTION OF EXAMPLE EMBODIMENTS

Figure 1:
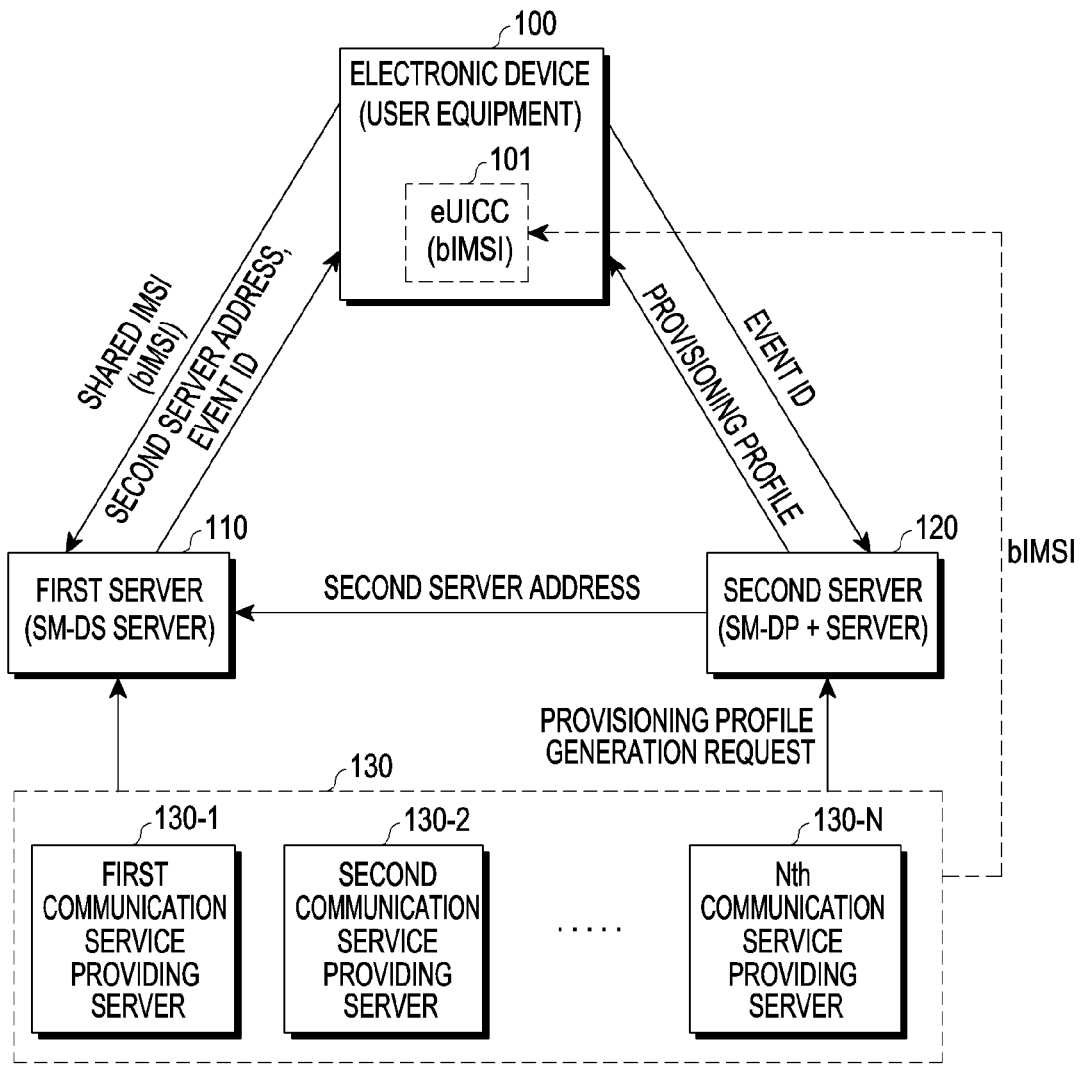
FIG. 1 is a diagram illustrating a system that remotely provides a profile to an electronic device according to an embodiment of the disclosure.

Hereinafter, various embodiments of the disclosure will be described with reference to the accompanying drawings. However, it should be understood that there is no intent to limit the disclosure to particular forms, and the disclosure should be construed to cover all modifications, equivalents, and/or alternatives falling within the spirit and scope of the embodiments of the disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expressions such as "first", "second", or the like used in various embodiments of the disclosure may modify various elements regardless of order or importance, and do not limit corresponding elements. The above-described expressions may be used to distinguish an element from another element. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no elements (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical terms and scientific terms, may have the same meaning as commonly understood by a person of ordinary skill in the art to which the disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, terms defined in this specification may not be interpreted as excluding embodiments of the disclosure.

An electronic device according to various embodiments of the disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

In some embodiments, an electronic device may be a smart home appliance. The home appliance may include at least one of, for example, a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship, and a gyro-compass), avionics, security devices, an automotive head unit, a robot for home or industry, an Automatic Teller's Machine (ATM) in banks, point of sales (POS) in a shop, or an internet device of things (e.g., a light bulb, various sensors, electric or gas meter, a sprinkler device, a fire alarm, a thermostat, a streetlamp, a toaster, sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the disclosure is not limited to the aforementioned devices, and may include a new electronic device according to the development of technology Various embodiments of the disclosure provide an electronic device that provides initial network access to an electronic device equipped with an eUICC so as to support downloading a profile from a corresponding server, even though a user does not visit an MNO shop or a provisioning profile is not mounted in advance in the electronic device, and a method of remotely providing a profile to an electronic device. Hereinafter, for ease of description, an electronic device is referred to as a user equipment (UE). However, a UE in the following embodiments may include various types of electronic devices, and may be replaced with one of the various types of electronic devices.

In the specification, from the perspective of functionality, a UICC includes an eUICC and entities similar thereto, which are capable of remotely downloading and installing a profile for the use of a communication service. However, from the physical perspective, the UICC includes various types of UICCs, including a UICC mounted to be detachable or a UICC embedded in a UE. Furthermore, an eUICC mentioned in the embodiments below is used for ease of description, and the eUICC may be replaced with one of the various types of UICCs.

For example, the UICC is a smart card which is used by being inserted into a UE. The UICC may indicate a chip that stores personal information such as the network access authentication information, phone book, SMS associated with a wireless communication subscriber, and performs subscriber authentication and traffic security key generation when the UE accesses a wireless communication network such as GSM, WCDMA, LTE, and the like, in order to support safe wireless communication. The UICC may include a communication application, such as a subscriber identification module (SIM), a universal SIM (USIM), an IP multimedia SIM (ISIM), a code division multiple access (CDMA) SIM (CSIM), depending on the type of wireless communication network that the subscriber accesses, or may provide a high level of security function for mounting various applications such as an electric wallet, a ticketing application, an electric passport, or the like. The term "UICC" in this specification may be used interchangeably with the term "SIM" and the term "eUICC" may be used interchangeably with the term "eSIM".

For example, an embedded UICC (eUICC) which is one of the examples of the UICC is assumed to be a secure module which is embedded in a UE and is provided in the form of a chip. If a UICC is manufactured in the form of an existing UICC which is detachable, has the same electric and software features as those of the eUICC, and has no functional difference from the eUICC, the embodiments of the specification may be applied equally.

Furthermore, in the specification, the UICC or the eUICC may be referred to as an electronic device or a small electronic device. The electronic device that includes a UICC or an eUICC may include a processor for processing a signal, a memory for storing a profile, and an interface for accessing a UE if the electronic device is manufactured to be detachable from the UE, which will be described with reference to corresponding drawings. In the specification, it is understood that a UE that remotely downloads a profile may include the electronic device.

The UICC according to an embodiment of the disclosure may download and install a profile using a normal Internet protocol (IP) network such as a wireless communication network, WiFi, or the like. Various embodiments of the disclosure may be applied, irrespective of the type of network used for downloading a profile.

In the specification, a profile may be a thing in which at least one of an application, a file system, and an authentication key value stored in the UICC is packaged in the form of software.

A USIM profile in this specification may have the same meaning as a profile, or may mean a thing in which information incorporated in a USIM application in a profile is packaged in a software format.

In the specification, an operational profile may be a thing in which subscriber information of a mobile carrier to which a user subscribes is packaged in the form of software. In the specification, a provisioning profile may be a profile that provides an environment in which a UE is capable of downloading the operational profile, and may be interchangeably used with a bootstrap profile. According to various embodiments, the bootstrap profile in the specification may be a profile for providing an environment for downloading the provisioning profile, and the above-described function and the function of the provisioning profile are together referred to as the bootstrap profile.

In the specification, a subscription manager data preparation (SM-DP) server or a subscription manager data preparation plus (SM-DP+) server may be expressed as a profile provision server, an off-card entity of profile domain, a profile encryption server, a profile generating server, a profile provisioner, or a profile provider.

In the specification, a subscription manager discovery service (SM-DS) server may perform a function of providing the addresses of one or more SM-DP+ servers to a UE (e.g., a local discovery service (LDS) of a UE).

In the specification, a profile identifier (Profile ID) may be referred to as a factor that matches to an integrated circuit card ID (ICCID), ICCID, and ISD-P. The profile ID may indicate the unique identifier of each profile.

In the specification, an E-UICC ID may be the unique identifier of an eUICC embedded in a UE, and may be referred to as an EID. Moreover, in cases where a UE and an eUICC (or an eSIM) chip are not detachable from each other as in an embodiment of the disclosure, the E-UICC ID may be a UE ID. Also, the E-UICC ID may indicate a predetermined secure domain of an eSIM chip.

In the specification, authentication codes may be random number values generated by an SM-DP+ server, and opening is normally processed only when a request for opening includes the corresponding random number values.

In the specification, an SM-DP address or an SM-DP+ address is an IP address, a uniform resource locator (URL), or an SM-DP server or SM-DP+ server address in the form of an ID, and may be used for identifying an SM-DP server or SM-DP+ server that is capable of generating a predetermined profile from among a plurality of SM-DP servers or SM-DP+ servers. In the specification, expressions, verifying an authentication code may be interchangeably used with authenticating an authentication code. It is obvious to one the skilled in the art that a processor, a control unit, or a controller used in the specification may be used while having the same meaning or similar meanings.

In the specification, a profile server may be expressed as a subscription manager (SM), a subscription manager plus (SM+), a subscription manager data preparation (SM-DP), a subscription manager data preparation plus (SM-DP+), a subscription manager-discovery serive (SM-DS), a subscription manager secure routing (SM-SR), a subscription manager secure routing plus (SM-SR+), profile delivery platform, profile delivery server, or the like. The profile server may be internally implemented as a single physical server or a plurality of physical servers. The profile server may verify a credential transmitted by a UE, and may transmit an encrypted profile to the UE if the credential is verified. The credential may be a credential for verifying whether a UE has a right to download a profile.

In the specification, a routing server may be a server configured in advance for a UE. The previously configured server may be configured when the UE is manufactured, or when the UE starts initial operation. Furthermore, the server may be configured when the UE starts operation for downloading a profile. The routing server may set a routing session, and may transfer, to a profile server, a communication packet for UE's profile downloading. The name of a routing server in the specification is merely expressed to represent its function, and it should be understood that any server device having a network function is capable of implementing the function.

In the specification, a wireless communication network may be a predetermined node in the wireless communication network. For example, the wireless communication network may be a base station, a subscriber information management node, a mobility management node of the wireless communication network, or the like.

In the specification, the wireless communication network may include a home location register (HLR) and an authentication center (AuC) server that perform subscriber authentication when a UE accesses, and may include a network and a server which provide voice communication or data communication when the UE accesses after authentication.

In the specification, the term "user equipment (UE)" may be referred to as a mobile state (MS), a terminal, a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. In the specification, a UE may be a UE containing a UICC which is inserted into the UE in the form of a socket, a UE containing an eUICC embedded therein, a UE including software or an application (e.g., a local profile assistant) installed in the UE to control an eUICC or UICC, or the like. Also, even in the case in which a UE and a UICC are connected using a separate communication device according to a technology such as a Bluetooth SIM access profile or the like, the UE including the UICC may be referred to as a UE.

Various embodiments of a UE may include a cellular phone, a smart phone having a wireless communication function, a tablet having a wireless communication function, a wearable device having a wireless communication function, a personal digital assistant (PDA) having a wireless communication function, a wireless modem, a portable computer having a wireless communication function, a photographing device having a wireless communication function, such as a digital camera, a gaming device having a wireless communication function, an electric appliance for storing and reproducing music, which has a wireless communication function, an Internet electric appliance capable of accessing and browsing Internet in a wireless manner, and portable units or UEs which include combinations of the functions. A measuring instrument including a communication function or the like may be included as a UE.

Furthermore, in the specification, a UE may include, but is not limited to a machine to machine (M2M) UE and a machine type communication (MTC) UE/device.

In the specification, a profile identifier (Profile ID) may be expressed as a factor that matches to profile identification information, an integrated circuit card ID (ICCID), and an issuer security domain-profile (ISD-P). For example, the profile ID may indicate the unique identifier of each profile. A profile delimiter may be used for identifying a profile in a network. In the specification, a UICC identifier may be the unique identifier of a UICC associated with a UE, and may be expressed as a UICC identifier or an eUICC ID (EID).

Also, predetermined terms used in the specification are defined to include at least some of the functions defined in related standard documents (e.g., the GSMA RSP Technical Specification Version 2.1 standard document, the 3GPP TS 23.122 standard document, and the like), and may be defined to further include functions described in various embodiments of the disclosure in addition to the functions defined in the standard documents.

Hereinafter, an electronic device according to various embodiments will be described with reference to the accompanying drawings. In the disclosure, the term "user" may indicate a person who uses an electronic device or a device (e.g., an artificial intelligence electronic device) which uses an electronic device.

FIG. 1 is a diagram illustrating a system that remotely provides a profile to an electronic device according to an embodiment of the disclosure. Referring to FIG. 1, a system according to an embodiment of the disclosure may be configured to include an electronic device 100 (e.g., a user equipment), a first server 110 (e.g., an SM-DS server), a second server 120 (e.g., an SM-DP+ server), a communication service provision server 130 (or an MNO server) (e.g., a mobile network operator (MNO) server), and the like. The second server 120 may correspond to a first communication service network (or first MNO network). For example, each second server 120 may correspond to each communication service network (or MNO network), and a plurality of second servers 120 may be configured in a single communication service network.

According to various embodiments of the disclosure, the electronic device 100 may be an electronic device in which a eUICC 101 is mounted. According to various embodiments, a "shared subscriber identification information (shared IMSI)" value, which is usable by accessing at least one communication provision server 130, may be stored as subscriber identification information (e.g., IMSI) in the eUICC 101. For example, the same shared subscriber identification information may be stored in each of the plurality of communication service provision servers 130. According to various embodiments, various operations (e.g., downloading a provisioning profile, downloading an operational profile, or the like) described below may be performed using the shared subscriber identification information which are equally stored in the plurality of communication service provision servers 130.

According to various embodiments of the disclosure described below, the shared subscriber identification information may be a subscriber identification information value which is used for receiving a profile, and may be referred to as temporary subscriber identification information (temporary IMSI), bootstrap IMSI, or bIMSI. In the description provided below, the shared subscriber identification information is referred to as bIMSI for ease of description. The plurality of communication service provision servers 130 may configure a consortium, and may support performing of operations standardized for bIMSI.

According to various embodiments, the bIMSI may be generated according to a predefined rule, so as to be distinguished from normal subscriber identification information (IMSI). For example, the electronic device 100 may identify that IMSI stored in the eUICC 101 is bIMSI by defining the MCC or MNC value included in the IMSI using a value that is not used for normal IMSI. For example, a five-digit or six-digit number corresponding to the MCC and MNC values of the IMSI is configured as a predetermined number which is not used (e.g., 999, 99, or the like), and if the predetermined number is identified or determined in the process of verifying the IMSI, the IMSI may be determined to be bIMSI. The bIMSI may be shared and stored by respective communication service provision servers 130 that support the embodiments of the disclosure described below. Each communication service provision server 130 may identify a bIMSI value stored in the eUICC 101 of the electronic device 100, and may support functions so that various embodiments of the disclosure are implemented. The bIMSI value may be generated by the communication service provision server 130, a UE manufacturer, a subscriber identification module (e.g., a SIM) vendor, or the like, when the electronic device 101 is manufactured, and may be stored in the eUICC 101 of the electronic device 100 in advance.

According to various embodiments of the disclosure, the respective communication service provision servers 130 may share and store the generated bIMSI value. Each communication service provision server 130 may transmit a request for generating a provisioning profile (or a bootstrap profile) to the second server 120, in response to the generation of the bIMSI. The second server 120 may generate a provisioning profile in response to the request from each communication service provision server 130, and may generate an event identifier (event ID) corresponding to the provisioning profile. The second server 120 may provide the generated event ID together with the address of the second server itself (e.g., the second server address) to the first server 110.

According to various embodiments of the disclosure, if the electronic device 100 is powered on and starts reading a subscriber identification module (e.g., an SIM) stored in the eUICC 101, the electronic device 100 may determine whether the IMSI value stored in the eUICC 101 is the bIMSI value. If the electronic device 100 determines that the IMSI value is the bIMSI value, a public land mobile network (PLMN) selection operation may be performed according to various embodiments of the disclosure.

For example, according to various embodiments, the electronic device 100 may search for at least one communication service provision server 130 (e.g., an MNO network) using a signal received in each frequency band in which the electronic device 100 is capable of performing reception. According to various embodiments, the electronic device 100 may select one communication service provision server from among the at least one retrieved communication service provision server 130 (e.g., common carrier network). The selected communication service provision server may be the network of communication service provision servers that share the bIMSI.

According to embodiments of the disclosure, the method of selecting the communication service provision server 130 may be implemented in various manners. For example, the electronic device 100 may automatically select the communication service provision server 130 retrieved first from among the at least one retrieved communication service provision 130 (or MNO network). According to another embodiment, the electronic device 100 may select a communication service of a frequency band having the highest signal strength (e.g., received signal strength indication (RSSI) and the like) among the at least one retrieved communication service. According to another embodiment, the electronic device 100 may display a list of the at least one retrieved communication service provision server 130 (or MNO) on a screen of the electronic device 100, and may enable a user to select one communication service provision server 130.

According to various embodiments, if one communication service provision server 130 (or MNO network) is selected according to the PLMN selection (hereinafter, the selected MNO network is referred to as a "first network", and the selected communication service provision server is referred to as a "first network server" or a "first network device"), access to the selected communication service provision server 130 is performed using the bIMSI. The selected communication service provision server 130 may identify the bIMSI value transmitted from the electronic device 100, and may provide a session for downloading a provisioning profile to the electronic device 100 according to various embodiments of the disclosure.

According to various embodiments of the disclosure, the electronic device 100 may access the first server 110 (e.g., an SM-DS server) via the first network, and may transmit the bIMSI value to the first server 110 and may request related information required for receiving a provisioning profile. For example, the electronic device 100 may transmit a message for requesting information required for requesting a provisioning profile to the first server 110, and the message may include the bIMSI value or a value corresponding to the bIMSI value.

According to various embodiments of the disclosure, as illustrated in FIG. 1, the first server 110 may identify the bIMSI value, and may provide the address of the second server and an event ID corresponding to a provisioning profile download event, in response to the request from the electronic device 100. According to various embodiments, the event ID may be information generated by the second server 120, and may indicate the identifier of an event associated with a predetermined EID.

According to various embodiments of the disclosure, the electronic device 100 may receive the address of the second server 120 (e.g., an SM-DP+ server) and the event ID from the first server 110, and may access the second server 120 using the received address of the second server. For example, the electronic device 100 may transmit the event ID to the second server 120, so as to request a provisioning profile corresponding to the event ID. For example, the electronic device 100 may transmit a message that requests a provisioning profile to the second server 120, and the message may include the event ID value. According to various embodiments, for example, the electronic device 100 may receive an event ID and the address of the second server 120 from the first server 110 in response to "ES11.AuthenticateClient Request", in the process of common mutual authentication defined in SGP.22 v2.1. According to various embodiments, the first server 110 may transfer, to the electronic device 100, an event ID that begins with the same prefix and MCCMNC on the basis of a matching ID value included in "ES11.AuthenticateClient Request", and may transmit the address of the second server 120 which corresponds to (is paired with) the event ID to the electronic device 100. Detailed embodiments thereof will be described later.

According to various embodiments of the disclosure, upon receiving a request for transmitting a provisioning profile from the electronic device 100, the second server 120 may identify the transmitted event ID, and may provide the provisioning profile corresponding to the event ID to the electronic device 100.

According to various embodiments, the electronic device 100 may receive the provisioning profile from the second server 120, and may execute (or install) the received provisioning profile. According to various embodiments of the disclosure, the electronic device 100 may download an operational profile from a corresponding server (e.g., the second server 120 or a market server, or the like) that stores the operational profile, in response to the execution of the provisioning profile.

Hereinafter, with reference to FIGS. 2 to 12, detailed embodiments in which the electronic device 100 executes a provisioning profile will be described. In the following embodiments, a description is provided with reference to at least some operations defined in standard documents, which may be applied when the above-described operations are implemented. According to various embodiments, embodiments described below may be implemented by complying with at least some of the operations defined in related standards, and may be implemented by modifying at least some of the operations defined in the related standards or by adding some functions. In the embodiments described below, a part related to the standard documents is provided as an example, and various embodiments of the disclosure are not limited to each embodiment described below.

First, the detailed configurations of an electronic device and a server are described with reference to FIGS. 2 and 3.

Subsequently, detailed operations performed by the electronic device and the server are described with reference to FIGS. 4 to 12.

Figure 2:
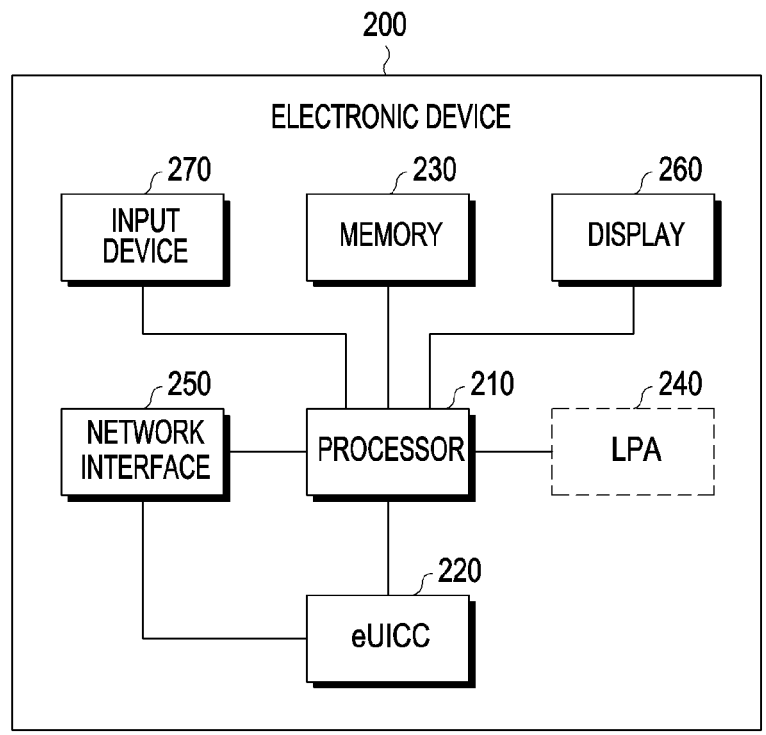
FIG. 2 is a block diagram illustrating a detailed configuration of an electronic device according to an embodiment of the disclosure.

FIG. 2 is a block diagram illustrating a detailed configuration of an electronic device according to an embodiment of the disclosure. Referring to FIG. 2, an electronic device 200 (e.g., the electronic device 100 of FIG. 1) according to an embodiment of the disclosure may be configured to include at least one of a processor 210, an eUICC 220 (e.g., the eUICC 101 of FIG. 1), a memory 230, a local profile assistant (LPA) 240, a network interface 250, a display 260, and an input device 270.

According to various embodiments of the disclosure, the LPA 240 may be included in the electronic device 200, or may be included in the eUICC 220 that provides features of a local profile download (LPD), local discovery services (LDS), and a local user interface (LUI). If the LPA 240 is located in the electronic device 220, the LPA 240 may be referred to as an LPAd, LPDd, LUId, LDSd, and the like. If the LPA 240 is located in the eUICC 220, the LPA 240 may be referred to as an LPAe, LPDe, LUIe, LDSe, and the like. According to various embodiments, the LPA 240 may be located in the eUICC 220, as described above, may be configured as a separate module as illustrated, or may be implemented in the form of software in the memory 230.

According to various embodiments, the LPA 240 may be implemented to transmit information stored in the eUICC 220 (e.g., MNO network information, MNO profile information, and the like) to an external server (e.g., the first server 110 or the second server 120 of FIG. 1) via the network interface 250, or may store, in the eUICC 220, information received from an external server via the network interface 250, when various embodiments of the disclosure described below are performed. According to various embodiments, when various embodiments of the disclosure described below are performed, the LPA 240 may enable information stored in the eUICC 220 (e.g., MNO network information, MNO profile information, and the like) to be displayed on the display 260, or may enable various processes to be processed on the basis of signal input via the input device 270. Although the LPA 240 is expressed as a component separate from the processor 210, at least some functions of the LPA 240 may be performed by the processor 210. Furthermore, the LPA 240 may be configured to be included in the processor 210, or the LPA 240 may inter-operate with the processor 210.

According to various embodiments, shared subscriber identification information (e.g., bIMSI) may be stored in the eUICC 220 of the electronic device 200. The processor 210 determines the type of the subscriber identification information stored in the eUICC 220, and if the result of determination shows that the subscriber identification information is shared subscriber identification information, the processor 210 may search for at least one MNO network which is connectable using the network interface 250.

According to various embodiments, the processor 210 may access an MNO network selected from among the at least one retrieved MNO network via the network interface 250 using the shared subscriber identification information.

An electronic device according to any one of the various embodiments of the disclosure may include: a communication interface; an embedded subscriber identification module configured to store shared subscriber identification information which is usable by accessing at least one communication service provision server; a processor electrically connected to the communication interface and the embedded subscriber identification module; and a memory electrically connected to the processor, wherein the memory includes instructions that when executed enable the processor to: determine a type of subscriber identification information stored in the embedded subscriber identification module; if a result of determination indicates that the subscriber identification information is the shared subscriber identification information, determine at least one communication service provision server to which the electronic device is connectable, from among a plurality of communication service provision servers; and access a communication service provision server selected from the at least one communication service provision server, via the communication interface.

According to various embodiments, the instructions may enable the processor to automatically select a communication service provision server retrieved first from among the at least one connectable communication service provision server.

According to various embodiments, the electronic device may further include a display, wherein the instructions enable the processor to: display a list of the at least one connectable communication service provision server on the display; and access a communication service provision server selected by a user input from the displayed list.

According to various embodiments, the instructions enable the processor to: transmit the shared subscriber identification information to the selected communication service provision server; and receive grant of access from the communication service provision server, in response to the transmission of the shared subscriber identification information.

An electronic device according to any one of the various embodiments of the disclosure may include: a network interface; an embedded subscriber identification module configured to store shared subscriber identification information which is usable by accessing at least one communication service provision server; a processor electrically connected to the network interface; and a memory electrically connected to the processor, wherein the memory includes instructions that when executed enable the processor to: identify the shared subscriber identification information stored in the embedded subscriber identification module; transmit the identified shared subscriber identification information to a first server via at least one communication service provision server to which the electronic device is connectable from among a plurality of communication service provision servers; receive access information associated with a second server that provides a provisioning profile, from the first server, in response to the transmission of the shared subscriber identification information; and request the provisioning profile from the second server, on the basis of the received access information associated with the second server.

According to various embodiments, the instructions may enable the processor to further receive event identification information corresponding to the provisioning profile from the first server.

According to various embodiments, the instructions may enable the processor to transmit, to the second server, the event identification information received from the first server so as to request the provisioning profile.

According to various embodiments, the instructions may enable the processor to perform mutual authentication with the first server.

According to various embodiments, the instructions may enable the processor to: receive the provisioning profile from the second server; request an operational profile from a server that stores the operational profile, in response to execution of the received provisioning profile; and receive the operational profile from the server in response to the request.

According to various embodiments, the instructions may enable the processor to: receive the provisioning profile from the second server; display a list of at least one profile on a screen of the electronic device in response to execution of the received provisioning profile; request an operational profile corresponding to a profile selected by a user input from the displayed list, from a server that stores the operational profile; and receive the operational profile from the server in response to the request.

According to various embodiments, the instructions may enable the processor to assign a priority to a profile corresponding to a communication service provision server to which the electronic device connects first, from among the at least one profile.

Figure 3:
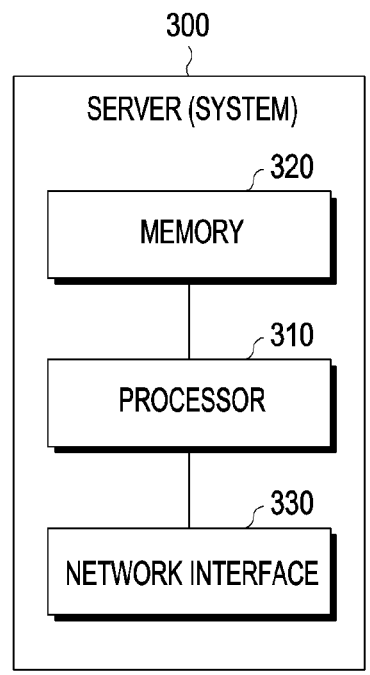
FIG. 3 is a block diagram illustrating a detailed configuration of a server according to an embodiment of the disclosure.

FIG. 3 is a block diagram illustrating a detailed configuration of a server according to an embodiment of the disclosure. Referring to FIG. 3, a server 300 (or a system) (e.g., the first server 110 or the second server 120 of FIG. 1) according to an embodiment of the disclosure may be configured to include a processor 310, a memory 320, and a network interface 330.

According to various embodiments of the disclosure, the processor 310 may generate a predetermined message using information or data stored in the memory 320, and may transmit the generated message via the network interface 330. According to various embodiments, the processor 310 may receive data transmitted from an external electronic device (e.g., the electronic device 200) or an external server (e.g., the first server 110 or the second server 120) via the network interface 330, may process a predetermined processing, and may store the result of the predetermined processing in the memory 320.

According to various embodiments, if the server 300 is the first server 110 of FIG. 1 (e.g., an SM-DS server), access information associated with a provisioning profile provision server (e.g., the second server 120 of FIG. 1) that provides a provisioning profile corresponding to each MNO network may be stored in the memory 320 of the server 300.

According to various embodiments, the processor 310 may receive an access information request message associated with the provisioning profile provision server from at least one electronic device (e.g., the electronic device 100 of FIG. 1 or the electronic device 200 of FIG. 2) via the network interface 300, and may identify subscriber identification information included in the received message. If the type of the identified subscriber identification information is shared subscriber identification information which is usable by accessing at least one communication service provision server, the processor 310 may perform control so as to transmit access information associated with the provisioning profile provision server stored in the memory 320 to the at least one electronic device 100 and 200 via the network interface 330.

According to various embodiments of the disclosure, if the server 300 is the second server 120 of FIG. 1 (e.g., an SM-DP+ server), an event ID corresponding to each provisioning profile and the provisioning profile information may be stored in the memory 320 of the server 300.

According to various embodiments, the processor 310 may receive a provisioning profile request message from at least one electronic device (e.g., the electronic device 100 of FIG. 1 or the electronic device 200 of FIG. 2) via the network interface 300, and may identify an event ID included in the received message. The processor 310 may perform control so as to identify a provisioning profile corresponding to the identified event ID, and to transmit the identified provisioning profile to the at least one electronic device 100 and 200.

A server (or system) (e.g., a subscriber management server) according to any one of the various embodiments of the disclosure may include: a network interface; a memory storing access information associated with a provisioning profile provision server that provides a provisioning profile corresponding to each communication service provision server; and a processor electrically connected to the network interface and the memory. The memory may store instructions that may control the processor to: receive an access information request message associated with the provisioning profile provision server from at least one electronic device via the network interface, identify the type of subscriber identification information included in the received message, and transmit, to the at least one electronic device, access information associated with the provisioning profile provision server stored in the memory via the network interface, if the identified subscriber identification information is shared subscriber identification information which is usable by accessing at least one communication service provision server.

According to various embodiments, the system may receive an event identifier corresponding to the provisioning profile from the provisioning profile provision server via the network interface.

According to various embodiments, the instructions may control the processor to transmit the received event identifier to the electronic device if the subscriber identification information included in the message received from the electronic device is shared subscriber identification information which is usable by accessing at least one communication service provision server.

Figure 4:
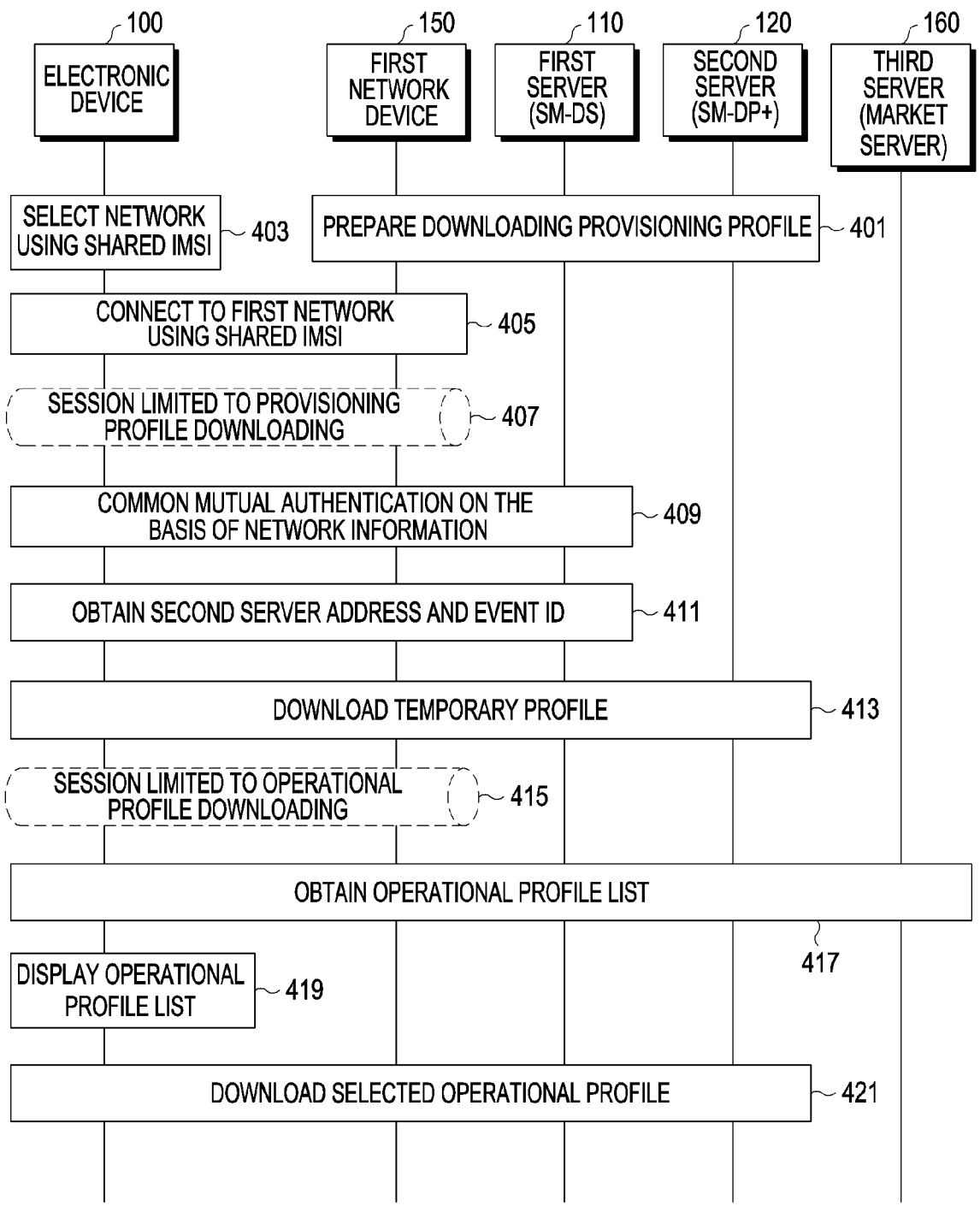
FIG. 4 is a signal flowchart illustrating operations of remotely providing a profile to an electronic device according to various embodiments of the disclosure.

FIG. 4 is a signal flowchart illustrating operations of remotely providing a profile to an electronic device according to various embodiments of the disclosure. Referring to FIG. 4, in operation 401, the first network device 150, the first server 110, and the second server 120 may perform preparation operations for downloading a provisioning profile (e.g., a bootstrap profile). According to various embodiments, if one communication service provision server (e.g., a first network) is selected according to PLMN selection by the electronic device 100, the selected communication service provision server is referred to as a "first network server" or the "first network device" 150.

According to various embodiments, the communication service provision server (or MNO server (e.g., an MNO)) may request the second server 120 to generate a provisioning profile. For example, the first network device 150 configured for the server of a first network operator among network operators may transmit a message for requesting generation of a provisioning profile, to the second server 120. The second server 120 may generate a provisioning profile in response to the provisioning profile generation request, and may generate and store an event ID corresponding to the generated provisioning profile. The second server 120 transmit the event ID to the first server 110 as the provisioning profile is generated, and may register the generation of the provisioning profile with the first server 110. The first server 110 may receive data related to the generation of the provisioning profile from the second server 120, may store the received data in the memory, and may complete preparation of downloading the provisioning profile. A detailed embodiment of the preparation of downloading a provisioning profile is described with reference to FIG. 5.

According to various embodiments of the disclosure, in operation 403, the electronic device 100 may select a network using shared IMSI (e.g., bIMSI) stored in an eUICC. For example, if the IMSI stored in the eUICC is a normal IMSI value, the electronic device 100 may access the network of a mobile network operator that the electronic device subscribes to according to subscriber information. According to various embodiments, if the IMSI stored in the eUICC is shared IMSI, the electronic device 100 may search for and access at least one operator network which is connectable using the shared IMSI.

For example, according to various embodiments of the disclosure, the electronic device 100 may select and access a single operator network according to predetermined criteria from among the at least one operator network retrieved by the electronic device 100. According to various embodiments, the electronic device 100 may select and access an operator network retrieved first, or may select and access an operator network having the highest received signal strength (e.g., an RSSI).

Figure 7:
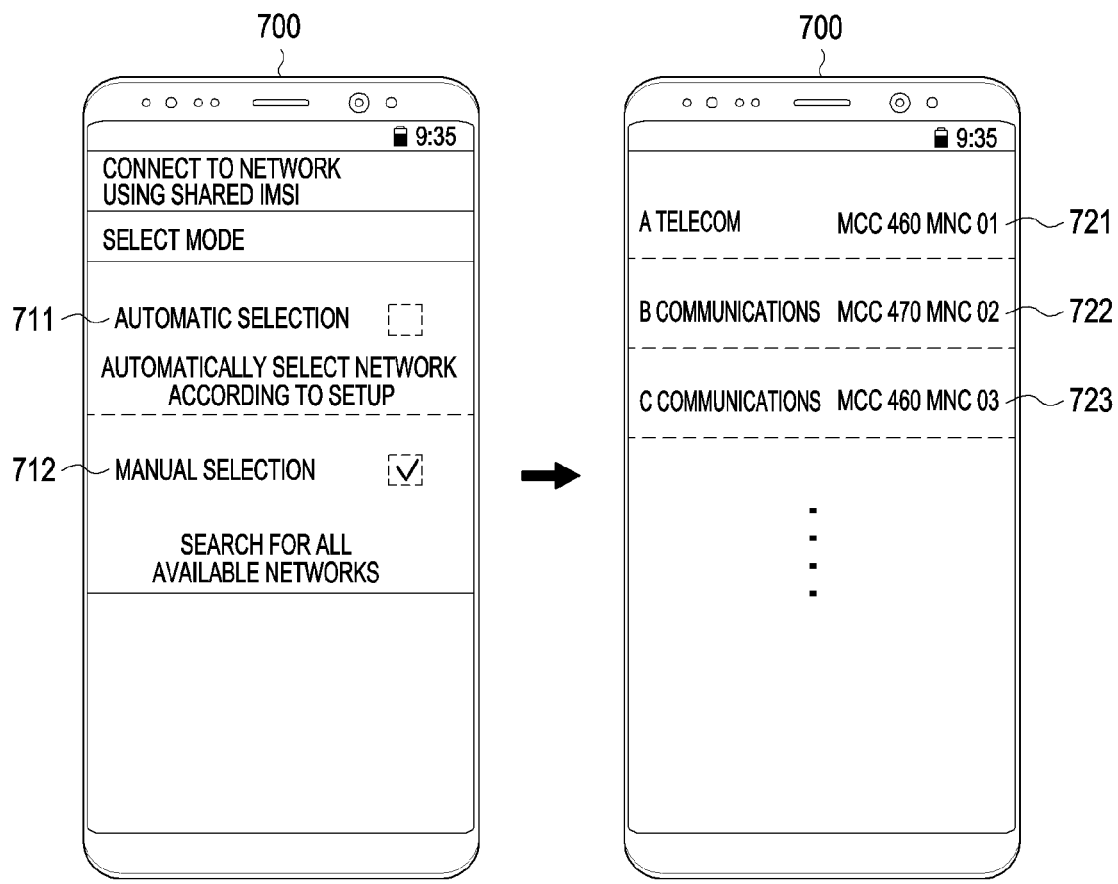
FIG. 7 is a diagram illustrating a screen for connecting to a network using shared subscriber identification information according to various embodiments.

According to various embodiments of the disclosure, the electronic device 100 may be implemented to display a list of at least one retrieved operator network on a screen as illustrated in FIG. 7, so that a user is capable of selecting one operator network.

According to various embodiments of the disclosure, if the electronic device 100 selects a first operator network, the electronic device 100 may attempt to access the first network using the shared IMSI in operation 405. The first operator network device 150 receives a shared IMSI value from the electronic device 100, and identifies the same, and if the first network operator is an operator that supports the shared IMSI, the first operator network device 150 may provide, to the electronic device 100, a session limited to provisioning profile downloading, in operation 407. For example, the electronic device 100 may be assigned with an Internet protocol (IP) value from the first network device 150.

According to various embodiments, the electronic device 100 may access the first server 110 using network information of the session provided from the first network device 150, and may perform a common mutual authentication procedure with the first server 110 in operation 409.

In operation 411, the electronic device 100 may obtain address information associated with the second server 120 that provides the provisioning profile, and an event ID corresponding to the provisioning profile, from the first server 110.

In operation 413, the electronic device 100 may access the second server 120 using the address information associated with the second server 120 received from the first server 110, may transmit the event ID received from the first server 110 to the second server 120, and may receive a provisioning profile corresponding to the event ID, and thus, the provisioning profile downloading is performed.

According to various embodiments of the disclosure, an event ID corresponding to each provisioning profile and the provisioning profile information may be stored in the second server 120. According to various embodiments, the second server 120 may receive a message for requesting a provisioning profile from the electronic device 100, and may identify an event ID included in the received message. The second server 120 may identify a provisioning profile corresponding to the identified event ID, and may transmit the identified provisioning profile to the electronic device 100.

In operation 514, the electronic device 100 may execute the downloaded provisioning profile, and when the provisioning profile is executed, a session limited to operational profile downloading may be established in operation 415.

In operation 417, the electronic device 100 may access the third server 160 (e.g., a market server) when the provisioning profile is executed, and may obtain an operational profile list corresponding to at least one operational profile from the second server 160.

In operation 419, the electronic device 100 may display an operational profile list (e.g., MNO names, available services, the amount of available data, fees, service provision speeds, and the like) corresponding to at least one operational profile on a screen, on the basis of information received from the third server 160. According to various embodiments, the electronic device 100 may preferentially display an operational profile corresponding to an operator network (e.g., the first operator network) that provides initial network access to the electronic device 100, in the operational profile list. For example, the electronic device may display the operational profile corresponding to the operator network that provides initial network access at the top, or may apply various effects to the same by increasing the size of text of the operational profile, or applying highlight to text.

Alternatively, according to various embodiments, the electronic device may allocate a relatively wide area to the display of the corresponding operational profile, or may be implemented to display the corresponding operational profile first on the screen and to sequentially display other operational profiles.

In operation 421, the electronic device 100 may download an operational profile selected from the displayed list. According to various embodiments of the disclosure, if the operator network of the operational profile selected by the electronic device 100 is the same as the operator network that the electronic device 100 accesses using the shared IMSI, the electronic device 100 may download an operational profile from the second server 120 corresponding to the same operator network. According to various embodiments of the disclosure, if the operator network of the operational profile selected by the electronic device 100 is different from the operator network that the electronic device 100 accesses using the shared IMSI, the electronic device 100 may change the currently connected operator network to the operator network corresponding to the selected operational profile so as to download the operational profile, or may access the second server 120 of the operator network corresponding to the operational profile via the currently connected operator network so as to download the operational profile.

According to various embodiments, information corresponding to each operational profile may be stored in the second server 120 or the third server 160. According to various embodiments, the second server 120 or the third server 160 may receive a message that requests a predetermined operational profile, from the electronic device 100, may identify a corresponding application profile in response to the request, and may transmit the identified application profile to the electronic device 100.

Hereinafter, referring to FIGS. 5 to 12, detailed embodiments in which the operations of FIG. 4 are implemented according to at least some functions defined in related standard documents are described in detail.

Figure 5:
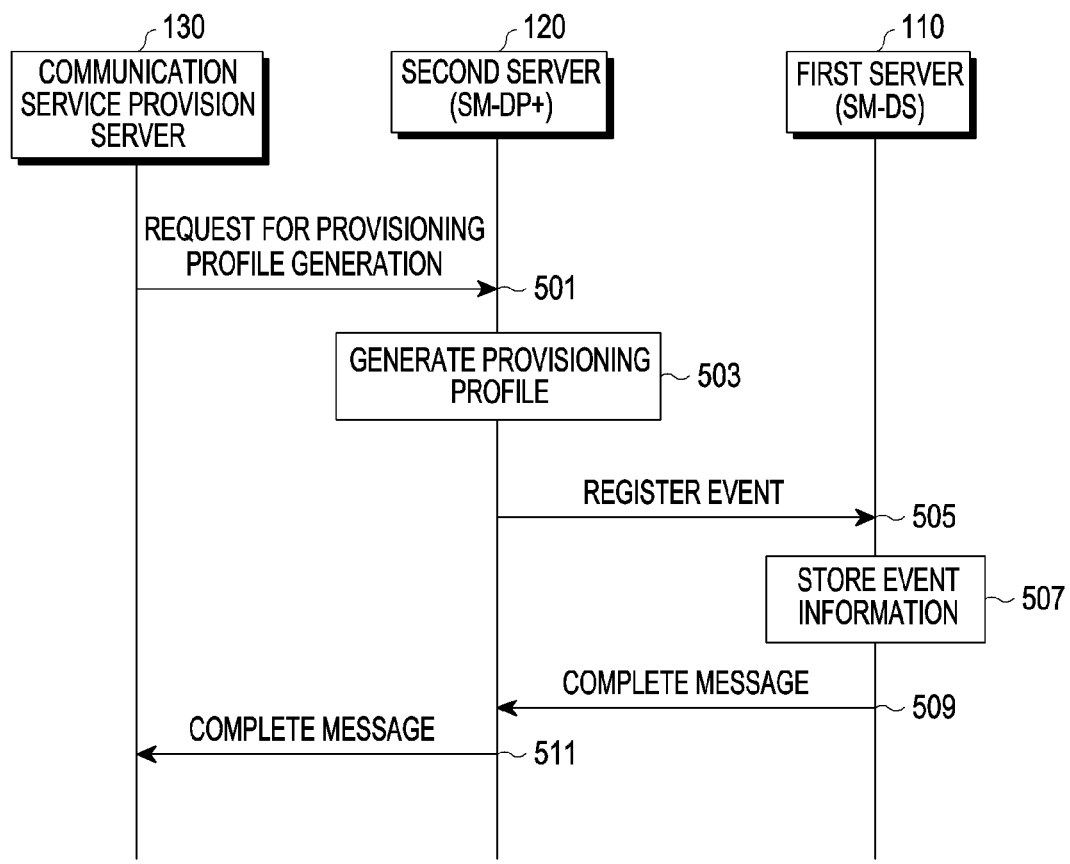
FIG. 5 is a signal flowchart illustrating operations of preparing downloading of a provisioning profile according to various embodiments of the disclosure.

FIG. 5 is a signal flowchart illustrating preparation of downloading a provisioning profile according to various embodiments of the disclosure. Referring to FIG. 5, in operation 501, the communication service provision server 130 (e.g., an MNO) may transmit a provisioning profile generation request message to the second server 120 (e.g., an SM-DP+ server). For example, the provisioning profile generation request message transmitted from the communication service provision server 130 to the second server 120 may correspond to an "ES2+ confirmOrder" message (e.g., a GSMA SGP.22 5.3.2 Function:ConfirmOrder message).

In operation 503, the second server 120 may generate a provisioning profile in response to the request, and may generate an event ID corresponding to the generated provisioning profile.

According to various embodiments of the disclosure, when generating the event ID, the second server 120 may generate the event ID, including a prefix or an identifier capable of specifying a provisioning profile (e.g., a bootstrap profile), so as to indicate that the event ID is an event ID corresponding to a provisioning profile.

For example, according to various embodiments of the disclosure, the event ID may be generated according to a program code as shown below.

```
EventEntries ::= SEQUENCE {
eventId UTF8String,
rspServerAddress UTF8String
}
eventId = Bootstrap Prefix $ MCCMNC $ ID
```

The type of the event ID generated according to the embodiment is "UTF8String", and thus, the event ID may include characters. For example, the event ID generated according to the program code may include numbers or characters, such as "BPROFILE$45001$0000123456", and a delimiter (e.g., "$") may be included between the numbers or characters.

According to various embodiments, the prefix of the event ID is expressed as "BPROFILE", which indicates that the event ID is not an event ID corresponding to a normal operational profile, but is an event ID corresponding to a provisioning profile for a bootstrap profile.

In operation 505, the second server 120 may request the first server 110 to register with an event corresponding to the generated provisioning profile. The event register message may correspond to an "ES12 RegisterEvent" message. At least one of an EID, a remote SIM provisioning (RSP) server address (e.g., the address of the second server 120), or an event ID may be included in the event register message.

In operation 507, the first server 110 may receive the event register message from the second server 120 and may store at least one piece of information included in the event register message in the memory. The information that the first server 110 stores may include at least one of the EID, the RSP server address, or the event ID.

According to various embodiments of the disclosure, if the first server 110 normally completes storing the event information, the first server 110 may transmit a complete message to the second server 120 in operation 509. In operation 511, the second server 120 may receive the complete message from the first server 110, and may transmit a complete message to the communication service provision server 130.

Figure 6:
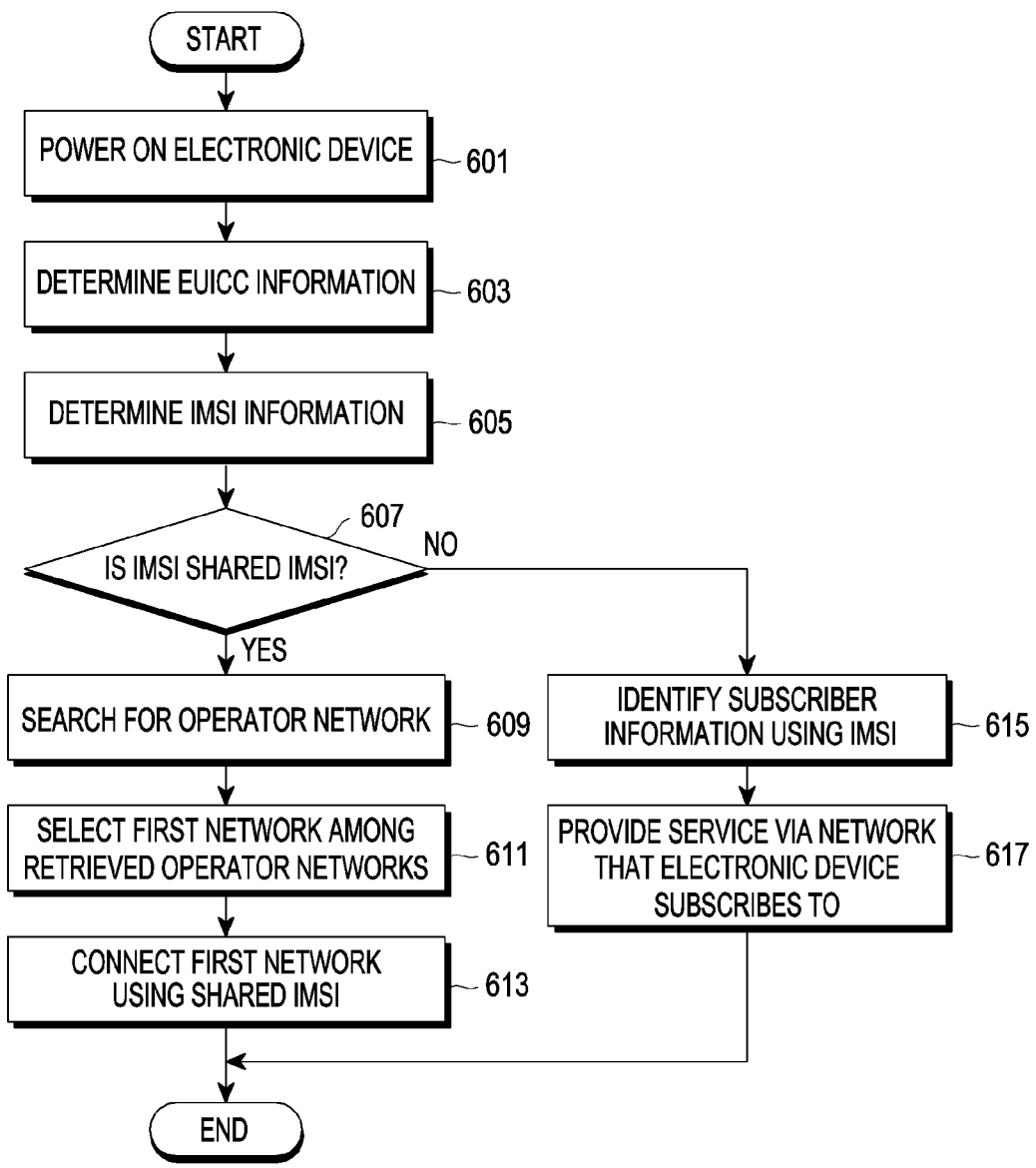
FIG. 6 is a flowchart illustrating operations of connecting to a network using shared subscriber identification information according to various embodiments.

FIG. 6 is a flowchart illustrating an operation of connecting to a network using shared subscriber identification information according to various embodiments. Referring to FIG. 6, an electronic device (e.g., the electronic device 100 of FIG. 1 and the electronic device 200 of FIG. 2) is powered on in operation 601, and the electronic device scans an eUICC and determines eUICC information in operation 603.

According to embodiments of the disclosure, the electronic device may scan the eUICC and may determine IMSI information stored in the eUICC in operation 605. If the result of determination shows that an IMSI value stored in the eUICC corresponds to shared IMSI in operation 607, the electronic device may search for at least one operator network in operation 609.

In operation 611, the electronic device may select one operator network from among the retrieved operator networks (it is assumed that a first network is selected for ease of description). According to various embodiments of the disclosure, the method of selecting one of the retrieved operator networks may be implemented in various manners.

According to various embodiments, if the first network is selected from among the retrieved operator networks, the electronic device may attempt connection to the selected first network using the shared IMSI in operation 613.

If the result of determination shows that the IMSI is not shared IMSI but is normal IMSI in operation 607, the electronic device may identify subscriber information included in the IMSI in operation 615.

In operation 617, the electronic device accesses a communication network to which a user subscribes, on the basis of the identified subscriber information, and may receive a wireless communication service via the connected communication network. For example, the electronic device may identify a home PLMN value, may search for a cell corresponding to the home PLMN, and may receive a service via the corresponding network.

FIG. 7 is a diagram illustrating a screen for connecting to a network using shared subscriber identification information according to various embodiments. Referring to FIG. 7, when an electronic device 700 attempts to connect to a network using shared IMSI, if a selection mode is set to an automatic selection mode 711, the electronic device 700 may select any one operator network according to a predetermined condition.

According to various embodiments of the disclosure, in the automatic selection mode 711, the electronic device 700 may automatically select an operator network retrieved first from among the at least one retrieved operator network. According to another embodiment, the electronic device 700 may select an operator network of a frequency band having the highest signal strength (e.g., received signal strength indication (RSSI) and the like) among the at least one retrieved operator network.

According to various embodiments of the disclosure, when the electronic device 700 attempts to connect to a network using the shared IMSI, if the selection mode is set to a manual selection mode 712, the electronic device 700 may display a list of a plurality of retrieved operator networks on a screen as illustrated in FIG. 7.

For example, the name of each MNO network may be displayed, such as A telecom 721, B communications 722, C communications 723, and the like, or the MCC and MNC values set for each MNO network may be displayed together with the name of each MNO network. According to various embodiments, if the plurality of MNO networks are displayed as describe above, names of MNO networks or the like may be sequentially displayed according to predetermined priorities.

According to various embodiments, a user may identify a list of MNO networks displayed in the electronic device 700, and may select a predetermined MNO network. If the predetermined MNO network is selected by the user, the electronic device 700 may attempt to connect to the selected MNO network using the shared IMSI (e.g., bIMSI) stored in the electronic device 700.

Figure 8:
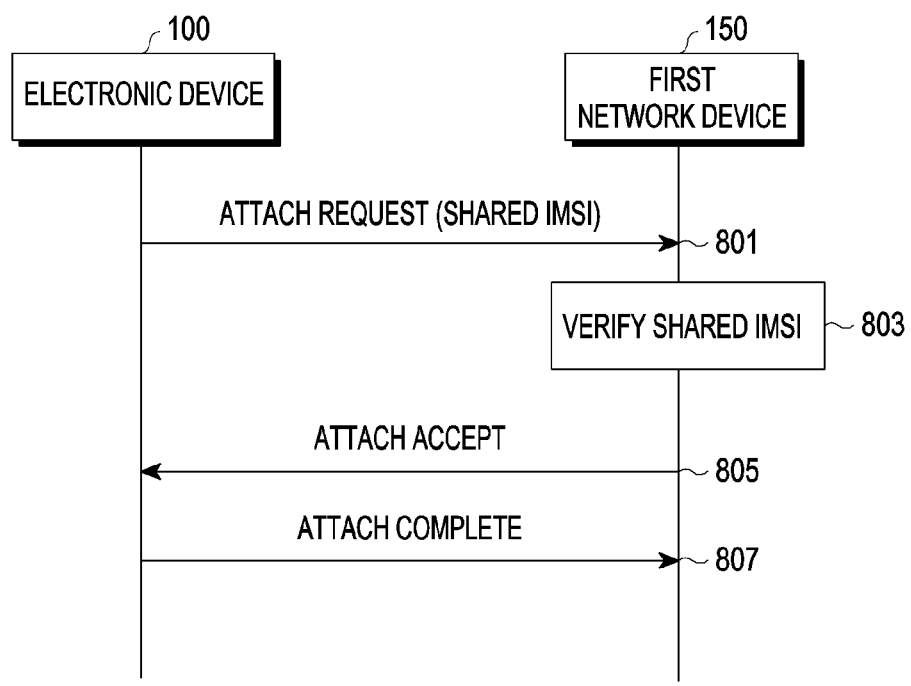
FIG. 8 is a signal flowchart illustrating operations of connecting to a network using shared subscriber identification information according to various embodiments.

FIG. 8 is a signal flowchart illustrating an operation of connecting to a network using shared subscriber identification information according to various embodiments. Referring to FIG. 8, if the first network is selected via the operations of FIG. 6, the electronic device 100 may transmit an access request (attach request) message to the first network device 150 corresponding to the selected first network, so as to attempt connection. The attach request message may include the shared IMSI (e.g., bIMSI).

In operation 803, the first network device 150 may verify shared IMSI included in the attach request message transmitted from the electronic device 100. If the result of verification shows that the shared IMSI is predetermined shared IMSI for downloading a provisioning profile, a session limited only to downloading a provisioning profile (e.g., a bootstrap profile) is allowed even though the electronic device 100 is not a subscriber that subscribes to the first network.

If the result obtained when the first network device 150 verifies the shared IMSI shows that the shared IMSI is a predetermined shared IMSI, an access accept (attach accept) message is transmitted to the electronic device 100 in operation 805. If the electronic device normally receives the attach accept message from the first network device 150, the electronic device 100 may transmit an attach complete message as a response in operation 807.

Figure 9:
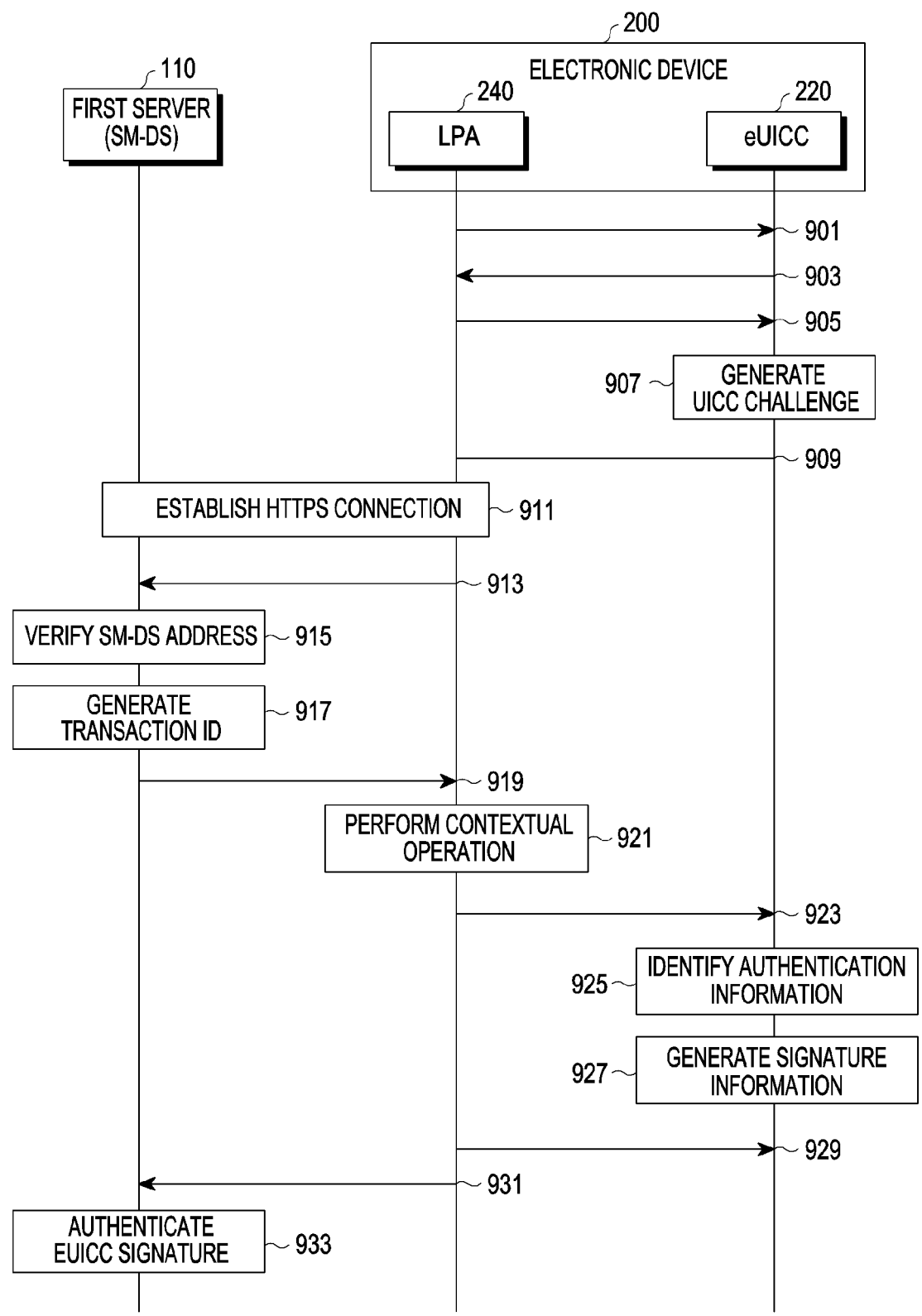
FIG. 9 is a signal flowchart illustrating operations of mutual authentication according to various embodiments of the disclosure.
Figure 10:
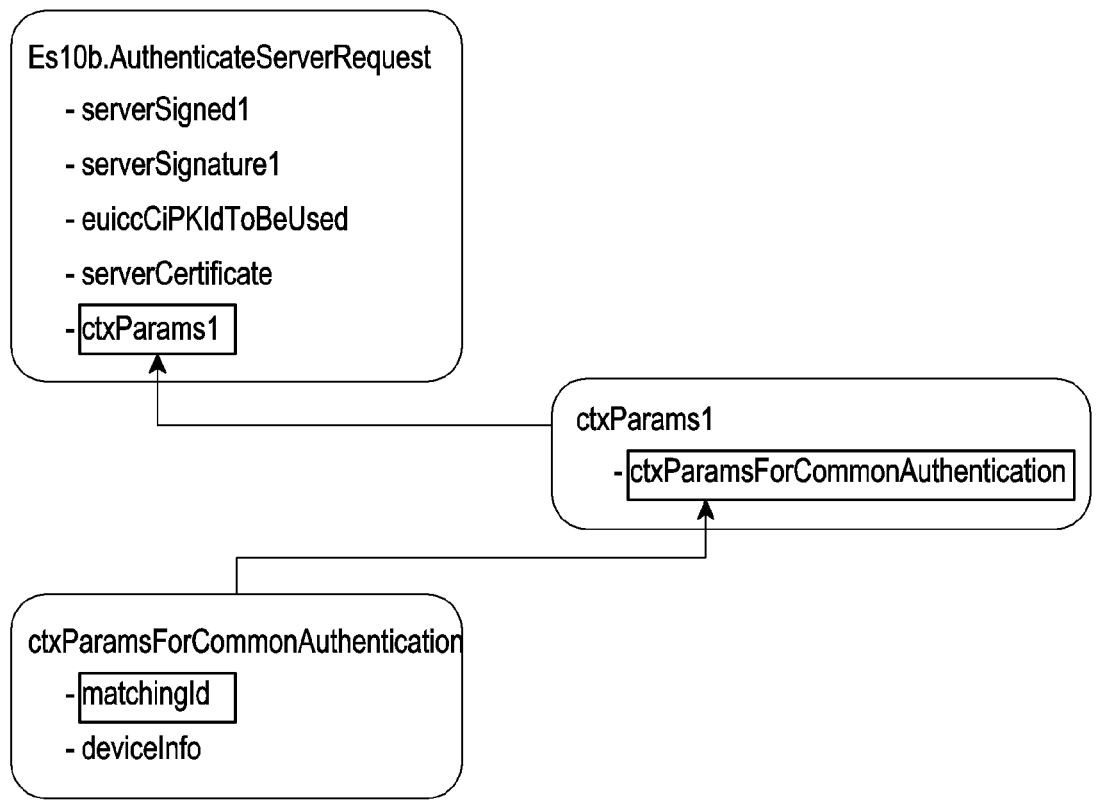
FIG. 10 is a diagram illustrating an example of the configuration of an authentication request message according to various embodiments of the disclosure.

FIG. 9 is a signal flowchart illustrating a mutual authentication operation according to various embodiments of the disclosure. FIG. 10 is a diagram illustrating an example of the configuration of an authentication request message according to various embodiments of the disclosure.

Referring to FIGS. 9 and 10, in operation 901, the LPA 240 (e.g., an LPAd) of the electronic device 200 may transmit an "ES10b.GetEUICCinfo" message to the eUICC 220. According to another embodiment, the eUICC 220 may transmit an "euiccinfo1" message to the LPA 240, in operation 903.

In operation 905, the LPA 240 may transmit an "ES10b.GetEUICCChallenge" message to the eUICC 220. In operation 907, the eUICC 220 may generate "euiccChallenge". In operation 909, the eUICC 220 may transmit the generated "euiccChallenge" to the LPA 240.

In operation 911, the first server 110 may establish a HTTPS connection with the LPA 240 of the electronic device 200. In operation 913, the LPA 240 of the electronic device 200 may transmit an "ESXX InitiateAuthentication" message to the first server 110. The "ESXX InitiateAuthentication" message may include "eUICCChallenge" generated by the eUICC 220 of the electronic device 200, "euiccinfo1", and SM-DS address information.

In operation 915, the first server 110 may verify the SM-DS address and euiccinfo1 in the received information. In operation 917, the first server 110 may generate "TransactionID", and may generate "serverChallenge". Furthermore, the first server 110 may generate "serverSigned1" and may calculate "serverSignature1" for "serverSigned1".

In operation 919, the first server 110 may transmit "euiccCiPKIdToBeUsed", and "CERT.XXauthECDSA" together with the generated "TransactionID", "server Signed1", "serverSignature1". In operation 921, the LPA 240 of the electronic device 200 may perform a contextual operation. For example, the LPA 240 may verify the SM-DS address, and may generate "ctxParams1".

In operation 923, the LPA 240 of the electronic device 200 may transmit an "ES10b.AuthenticateServer" message to the eUICC 220. The "ES10b.AuthenticateServer" message may include "ctxParams1" generated by the LPA 240, together with "serverSigned1", "serverSignature1", "euiccCiPKIdToBeUsed", and "CERT.XXauthECDSA".

According to various embodiments, the LPA 240 may identify whether the electronic device 200 currently accesses (attach) the network using the bIMSI, during the mutual authentication with the first server 110. For example, if the electronic device 200 is currently attached to the network using the bIMSI, the electronic device 200 may include a provisioning profile (e.g., a bootstrap profile) request and current network information (e.g., MCC and MNC) in "CtxParams1" when configuring the "ES10b.AuthenticateServer" message transmitted in operation 923, and may transmit the same to the eUICC 220 as illustrated in FIG. 10. FIG. 10 is a diagram illustrating an example of the configuration of an authentication request message (e.g., the "ES10b.AuthenticateServer" message) according to various embodiments of the disclosure.

According to various embodiments, in the process of generating "matching)" illustrated in FIG. 10, according to the following program code, a provisioning profile is requested and network information is included.

```
CtxParamsForCommonAuthentication ::= SEQUENCE {
  matchingId UTF8String OPTIONAL, -- The MatchingId could be the
  Activation code token or EventID or empty
  deviceInfo DeviceInfo -- The Device information
}
```

According to various embodiments, as the program code is executed, matchingID may be configured in the following form.

matchingId=Bootstrap Prefix $ MCCMNC $ bIMSI

According to various embodiments, if the type of "matching)" is configured to be UTF8String, characters may be included as shown below. According to various embodiments, in the process of generating "matchingID", a prefix, which is the same as a prefix used when an event ID is generated, may be used. For example, "matchingId" may be configured using the following information.

Prefix=BPROFILE
MCCMNC=45001
bIMSI=9999901234567
→matchingId=BPROFILE $45001$9999901234567

According to various embodiments, the eUICC 220 may generate "euiccSigned1" including delivered "CtxParams1", may include the generated information in an "ES10b.AuthenticateServerResponse" message, and may transfer the same to the LPA 240. The LPA 240 may configure an "ES11.AutheticateClient" message including the delivered "AuthenticateServerResponse" message, and may transfer the same to the first server 110.

For example, in operation 925, the eUICC 220 of the electronic device 220 may receive the information from the LPA 240 as authentication information, and may identify "CERT.XXauthECDSA". The eUICC 220 may identify "serverSignature1" for "serverSigned1", and may identify "serverSigned1".

In operation 927, the eUICC 220 may generate "euiccSigned1" as signature information, and may calculate "euiccSignature1" for the generated "euiccSigned1".

In operation 929, the eUICC 220 may transmit "euiccSigned1", "euiccSignature1", "CERT.EUICC.ECDSA", and "DERT.EUM.ECDSA" to the LPA 240. In operation 931, the LPA 240 may transmit "ESXX.AuthenticateClient" message, "CERT.EUICC.ECDSA", and "DERT.EUM.ECDSA" to the first server 110. The "ESXX.AuthenticateClient" message may include euiccSigned1 and euiccSignature1.

In operation 933, the first server 110 may respectively authenticate euiccSigned1, euiccSignature1, CERT.EUICC.ECDSA, and DERT.EUM.ECDSA, received from the LPA 240 of the electronic device 200.

Figure 11:
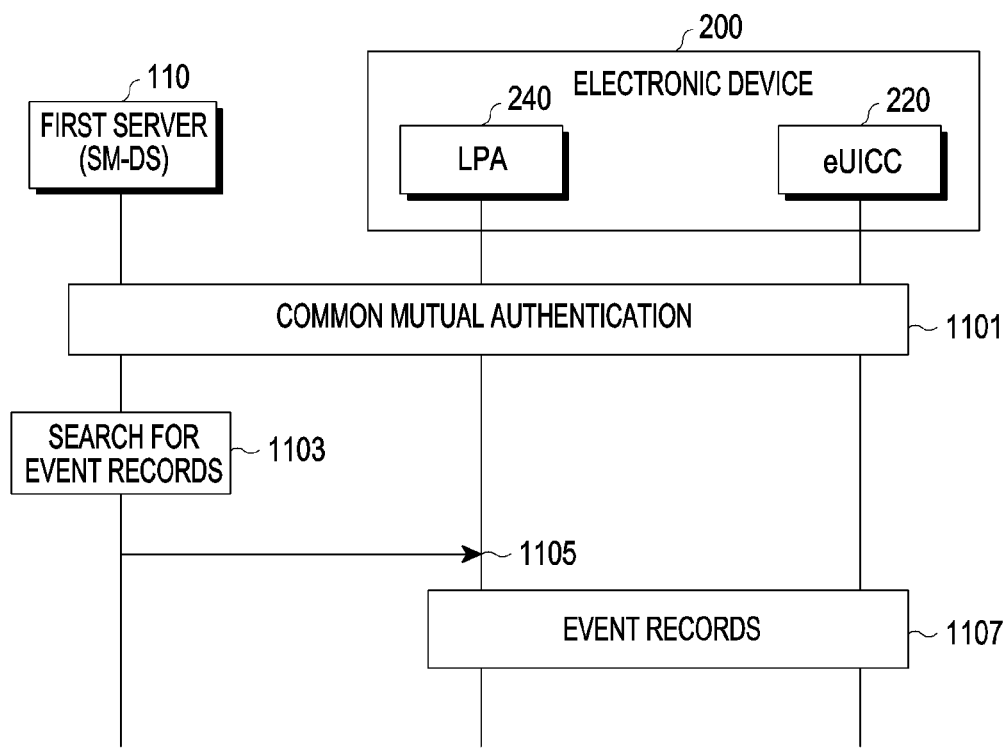
FIG. 11 is a signal flowchart illustrating operations of obtaining event information according to various embodiments of the disclosure.

FIG. 11 is a signal flowchart illustrating an operation of obtaining event information according to various embodiments of the disclosure. Referring to FIG. 11, in operation 1101, the first server 110 may perform common mutual authentication with the electronic device 200 as described above.

In operation 1103, the first server 110 may search for an event record. For example, the first server may search for pending event records associated with the eUICC 220. According to various embodiments, the first server 110 obtains network information from a matching ID (matchingId) transferred from the electronic device 200, and may search for the address of the second server 120 (e.g., an SM-DP+) that operates in the network. Also, Furthermore, according to various embodiments of the disclosure, the first server 110 may identify a bIMSI value from the matching ID transferred from the electronic device 200, and may search for an event ID of a provisioning profile. In operation 1105, the first server 110 may transmit an RSP server address (e.g., the address of an SM-DP+) and the set value of the event ID, to the LPA 240 of the electronic device 200.

According to various embodiments of the disclosure, while performing the common mutual authentication in operation 1101, as a response to "ES11.AuthenticateClient", the electronic device 200 may receive the RSP server address (e.g., the address of the SM-DP+ server) and the set value of the event ID from the first server 110 in operation 1105.

According to various embodiments, the first server 110 may identify an event ID which begins with the same prefix and MCC and MNC on the basis of "matchingId" included in "ES11.AuthenticateClient" received from the electronic device 200, and may transfer the identified event ID to the electronic device 200. Furthermore, the first server 110 may transfer the address of an RSP server (e.g., an SM-DP+ server) mapped to the identified event ID to the LPA 240 of the electronic device 200.

According to various embodiments of the disclosure, the LPA 240 may receive the set values from the first server 110, and may continuously process event records, together with the eUICC 220 in operation 1107. For example, the LPA 240 may store, in the eUICC 220, an RSP server address (e.g., the address of the SM-DP+ server) and the set value of an event ID received from the first server 110.

According to various embodiments of the disclosure, the LPA 240 of the electronic device 200 may receive an event ID and the address information of the second server 120 from the first server 110, and may transmit an initiateAuthentication message to a server corresponding to the received address of the second server 120 using an ES9 interface, thereby performing mutual authentication with the second server. According to various embodiments of the disclosure, after the mutual authentication, a corresponding event may be performed together with (e.g., provisioning profile data may be received from) the authenticated second server 120.

According to various embodiments of the disclosure, the eUICC 220 of the electronic device 200 may perform authentication with the second server 120, and may install or delete a profile received from the second server 120. According to various embodiments of the disclosure, while performing the mutual authentication with the second server 120, the LPA 240 transmits a server authentication message (AuthenticateServer) to the eUICC 220 via the ES10 interface, and the eUICC 220 may transmit a response to the transmission again to the LPA 240. According to various embodiments of the disclosure, if an error does not occur during the mutual authentication, the electronic device 200 may perform a corresponding event with the second server 120 (e.g., installing a provisioning profile in the eUICC 220).

Figure 12:
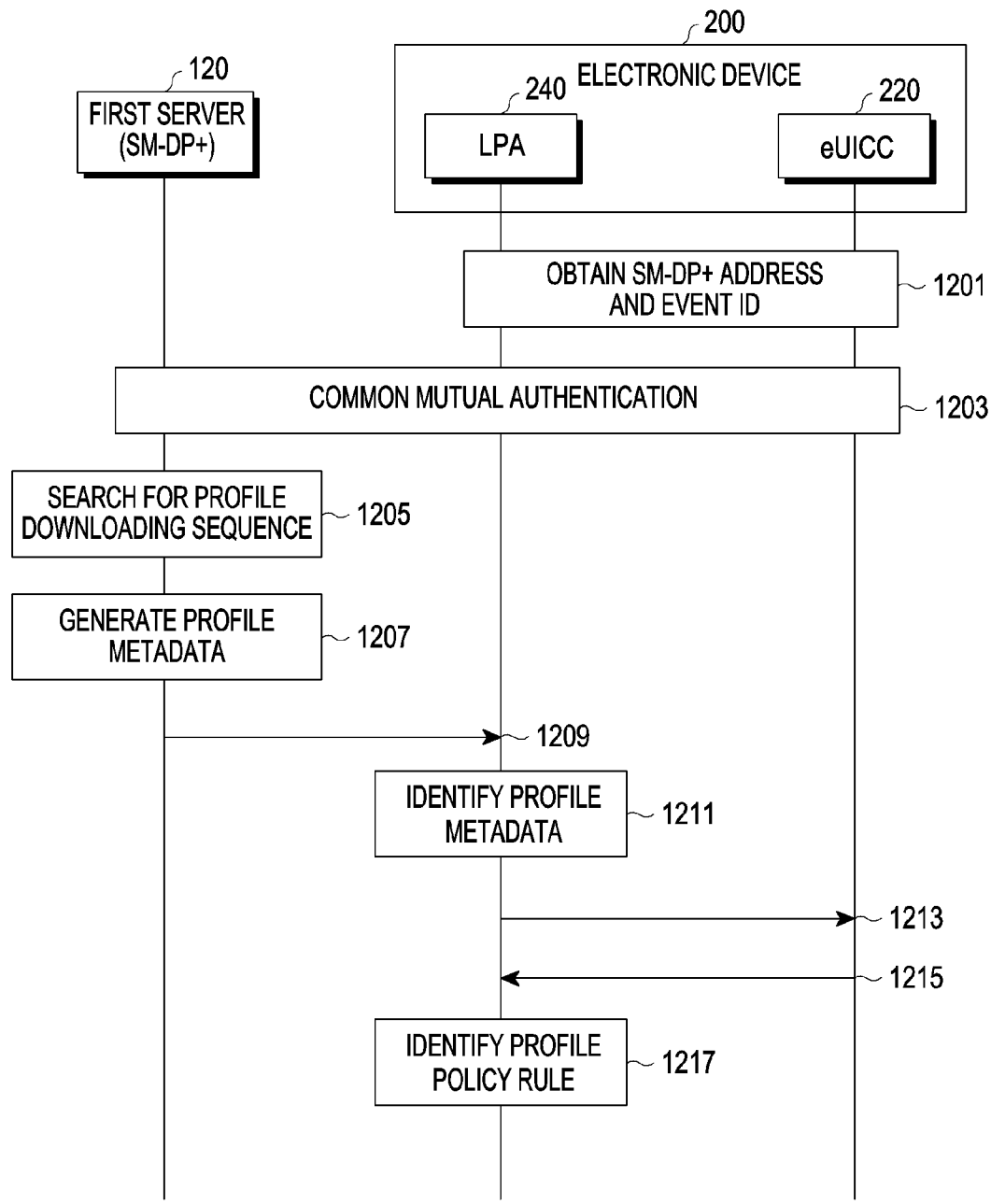
FIG. 12 is a signal flowchart illustrating operations of downloading of a provisioning profile according to various embodiments of the disclosure.

FIG. 12 is a signal flowchart illustrating an operation of downloading of a provisioning profile according to various embodiments of the disclosure. Referring to FIG. 12, in operation 1201, the electronic device 200 may obtain the address of an SM-DP+ server and an event ID as illustrated in FIG. 11. In operation 1201, the electronic device 200 may perform the common mutual authentication described in FIG. 9 with the second server 120, in the same manner as the authentication with the first server 110.

In operation 1205, the second server 120 searches for a profile downloading sequence, and may perform verification using device information and euiccinfor2. In operation 1207, the second server 120 may generate profile metadata and may identify an attempt to perform downloading. According to various embodiments of the disclosure, the profile metadata includes at least one of an ICCID for the profile, a profile name, a service provider name, a user profile neckname, an icon, a profile class, "Notification Configuration Information", a profile owner, or a profile policy rule.

In operation 1209, the second server 120 may transmit at least one piece of related information from among "TransactionID", profile metadata, "smdpSigned2", "smdpSignature2", or "CERT.DPpb.ECDSA" to the LPA 240 of the electronic device 200.

The LPA 240 may identify whether PPRs are included in the profile metadata in operation 1211, and may transmit "ES10b.GetRAT" to the eUICC 220 in operation 1213. In operation 1215, the eUICC 220 may transmit a "ProfileInfoListOk" message to the LPA 240. In operation 1217, the LPA 240 may identify whether a PPR is allowed with respect to an RAT, and may perform user authentication.

Each functional unit and module in various embodiments of the disclosure may indicate a functional or structural coupling of hardware for executing the technical idea of embodiments of the disclosure and software for operating the hardware. For example, the each functional unit may mean a predetermined code and a unit of logic of a hardware resource for performing the predetermined code. However, those skilled in the technical field of the disclosure may easily understand that the each functional unit does not mean physically connected codes or one kind of hardware.

According to various embodiments of the disclosure, at least one operation may be omitted from the operations of FIGS. 4 to 12 or at least one different operation may be added to the operations. In addition, the operations of FIG. 4 or 12 may be performed in the shown sequence. Alternatively, an execution sequence of at least one operation may be exchanged with an execution sequence of another operation. Furthermore, the operations of FIGS. 4 to 12 may be performed by an electronic device, or may be performed by a server. At least one of the operations illustrated in FIGS. 4 to 12 may be performed within an electronic device and the remaining operations may be performed by a server.

In the operation method of an electronic device according to any one of the various embodiments of the disclosure, a method of remotely providing a profile to an electronic device may include: determining whether subscriber identification information stored in a subscriber identification module embedded in the electronic device is shared subscriber identification information which is usable by accessing a communication service provision server; transmitting the shared subscriber identification information to a first server, via at least one communication service provision server to which the electronic device is connectable from among a plurality of communication service provision servers; receiving, from the first server, access information associated with a second server that provides a provisioning profile in response to the transmission of the shared subscriber identification information; and requesting the provisioning profile from the second server, on the basis of the received access information associated with the second server.

According to various embodiments of the disclosure, the method may further receive event identification information corresponding to the provisioning profile from the first server.

According to various embodiments of the disclosure, the method may further include transmitting, to the second server, the event identification information received from the first server, so as to request the provisioning profile.

According to various embodiments of the disclosure, the method may enable the electronic device to perform mutual authentication with the first server.

According to various embodiments of the disclosure, the method may further include: receiving the provisioning profile from the second server; requesting an operational profile from a server that stores the operational profile, in response to execution of the received provisioning profile; and receiving the operational profile from the server, in response to the request.

According to various embodiments of the disclosure, the method may include: receiving the provisioning profile from the second server; displaying a list of at least one profile on a screen of the electronic device, in response to execution of the received provisioning profile; requesting an operational profile corresponding to a profile selected by a user input from the displayed list, from a server that stores the operational profile; and receiving the operational profile from the server, in response to the request.

FIGS. 13, 14, 15, 16, 17, 18, and 19 are diagrams illustrating examples of a screen of an electronic device that purchases a profile via a market server according to various embodiments of the disclosure.

According to various embodiments of the disclosure, a smart phone in which an eUICC (e.g., an eSIM) is mounted in a manufacturing process may be released. According to various embodiments of the disclosure, bIMSI may be stored in the eSIM as a bootstrap IMSI.

If a user who purchases the smart phone opens the smart phone and turns on its power, the smart phone may identify bIMSI included in the eSIM during a SIM reading process as described with reference to embodiments of the disclosure, and even though the user has not yet subscribed to a predetermined operator network, the smart phone may automatically perform network initial access to an operator network.

According to various embodiments of the disclosure, after the initial network access on the basis of the bIMSI, a provisioning profile (e.g., a bootstrap profile) is automatically downloaded and installed, and is executed, and an operational profile may be downloaded and installed in response to the execution of the provisioning profile.

Figure 13:
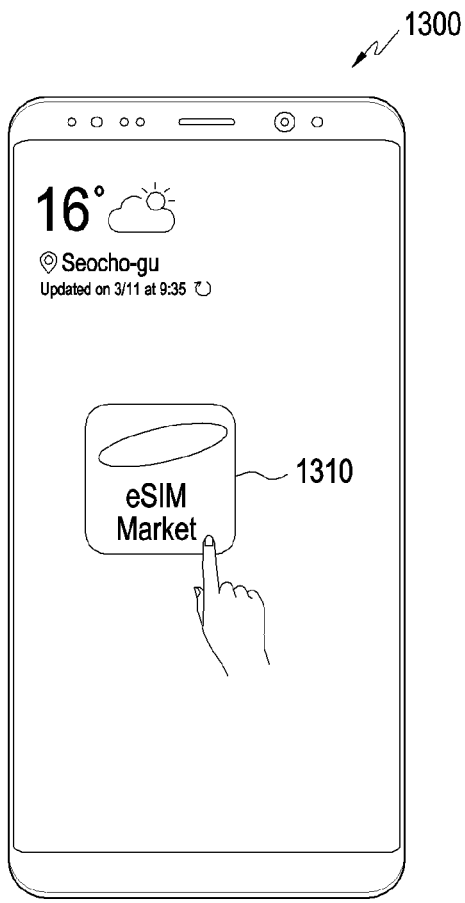
FIGS. 13, 14, 15, 16, 17, 18, and 19 are diagrams illustrating examples of a screen of an electronic device that purchases a profile via a market server according to various embodiments of the disclosure.

FIG. 13 illustrates a screen showing that a profile is downloaded and installed after the above-description operation is performed when a user turns on a smart phone 1300 according to an embodiment of the disclosure. According to various embodiments of the disclosure, as illustrated in FIG. 13, as an application for purchasing and/or installing an operational profile, an icon 1310 named "eSIM market" is displayed on a screen.

According to various embodiments, if the user selects the icon 1310 on the screen of FIG. 13, an application corresponding to the icon 1310 is executed and the smart phone accesses the corresponding eSIM market server. Accordingly, a screen of FIG. 14 may be displayed.

Figure 14:
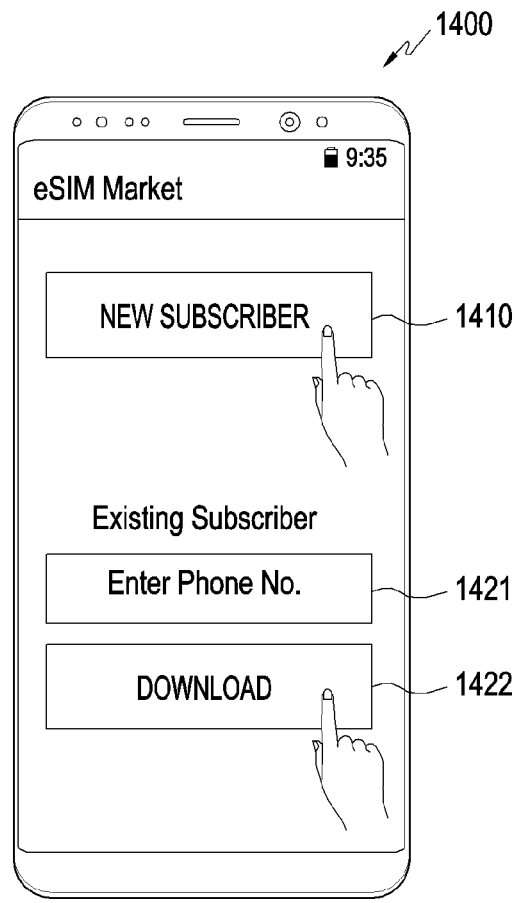

Referring to FIG. 14, the screen of a smart phone 1400 may display a button 1410 for proceeding with subscription to a new network service, a button 1421 for inputting existing subscriber information, or a button 1422 for downloading previously stored subscriber information.

Figure 15:
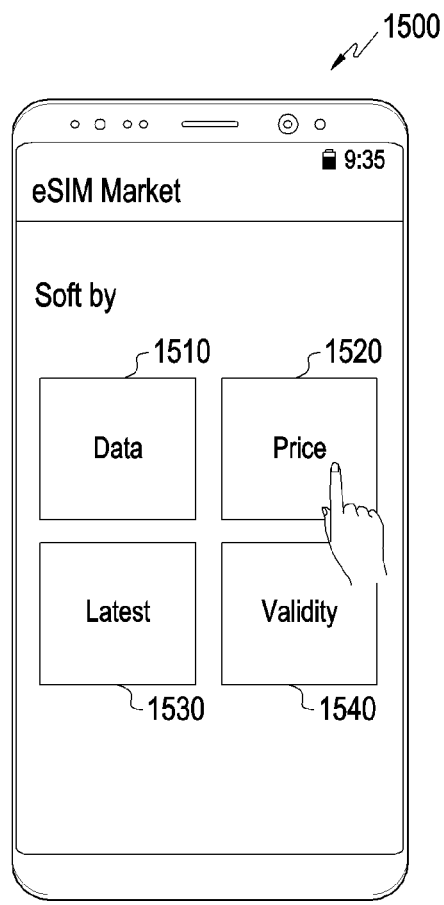

According to various embodiments of the disclosure, if a button for newly proceeding with subscription is pressed in FIG. 14, the screen of a smart phone 1500 may display buttons 1510, 1520, 1530, and 1540 which indicate criteria to be used for sorting a plurality of purchasable plans as illustrated in FIG. 15. For example, referring to FIG. 15, the buttons 1510, 1520, 1530, and 1540 for sorting a plurality of purchasable plans on the basis of a data size, price, latest, validity, and the like may be illustrated.

If the button 1520 is selected, on the screen of FIG. 15, for selecting "price" as a criterion for sorting according to an embodiment, purchasable plans are sorted by price and are displayed on the screen of the smart phone 1600. For example, information, such as a name 1610, a price 1620, usable data capacity 1630, and the like may be displayed for each plan.

Figure 16:
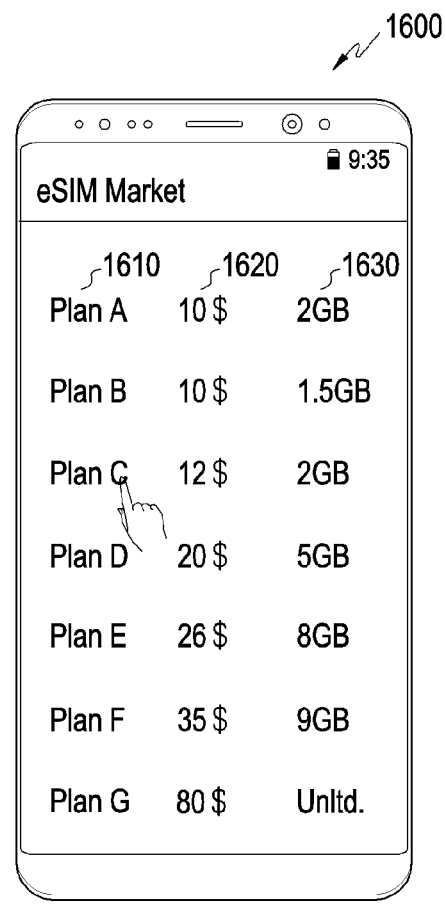
Figure 17:
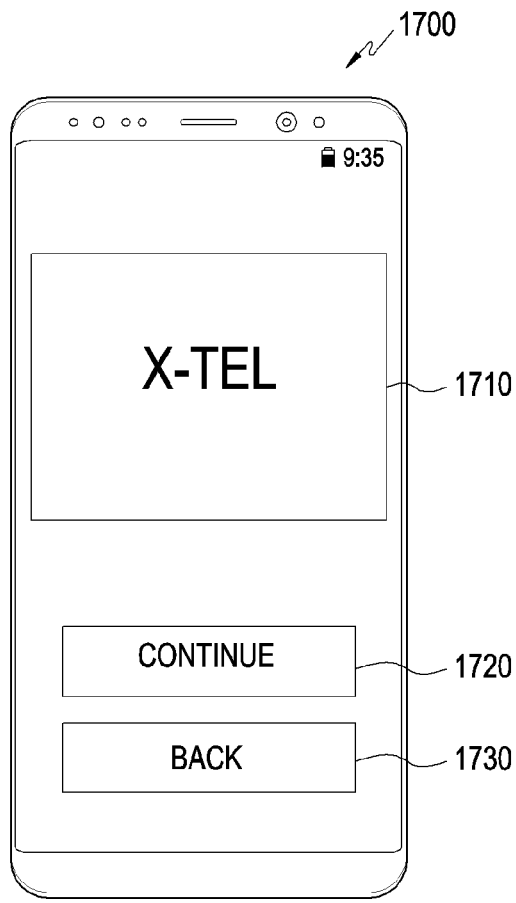

If the user selects purchasing a predetermined plan (e.g., plan C) in FIG. 16, a screen for enabling a purchasing procedure associated with the selected plan to be performed may be displayed on the screen of a smart phone 1700 as illustrated in FIG. 17. For example, the operator of plan C selected by the user is "X-TEL", and an image 1710 of the corresponding operator may be displayed on the screen. Subsequently, if a button 1720 is selected, a service purchasing procedure corresponding to the price (12$) and usable data capacity (2GB) of the plan C is performed, or if a "BACK" button is selected, the screen returns to a previous screen (e.g., the plan select screen of FIG. 16).

Figure 18:
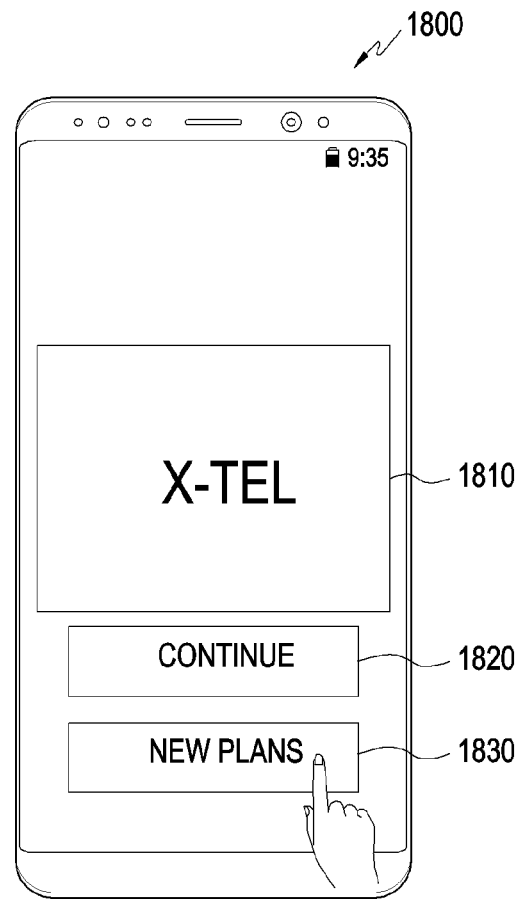

According to various embodiments of the disclosure, if the button 1422 for downloading existing subscriber information is selected on the screen displayed in the smart phone 1400 of FIG. 14, an image 1810 of a network operator which a smart phone 1800 currently subscribes to, a selection button 1820 for continuously using the plan of the network operator, or a button 1830 for selecting a new plan provided by the corresponding network operator may be displayed on the screen of the smart phone 1800 as illustrated in FIG. 18.

Figure 19:
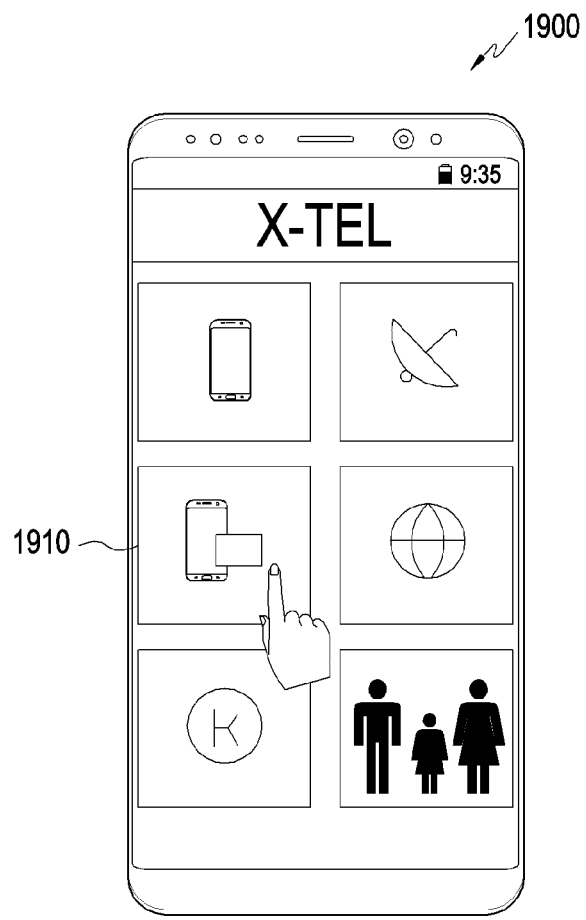

For example, the button 1830 for selecting new plans provided by the corresponding network operator is selected by the user on the screen of FIG. 18, menus for selecting various services provided by the same network operator (e.g., "X-TEL") may be provided on the screen of a smart phone 1900, and a button 1910 for selecting a predetermined plan from among the provided various service menus may be displayed, as illustrated in FIG. 19.

Figure 20:
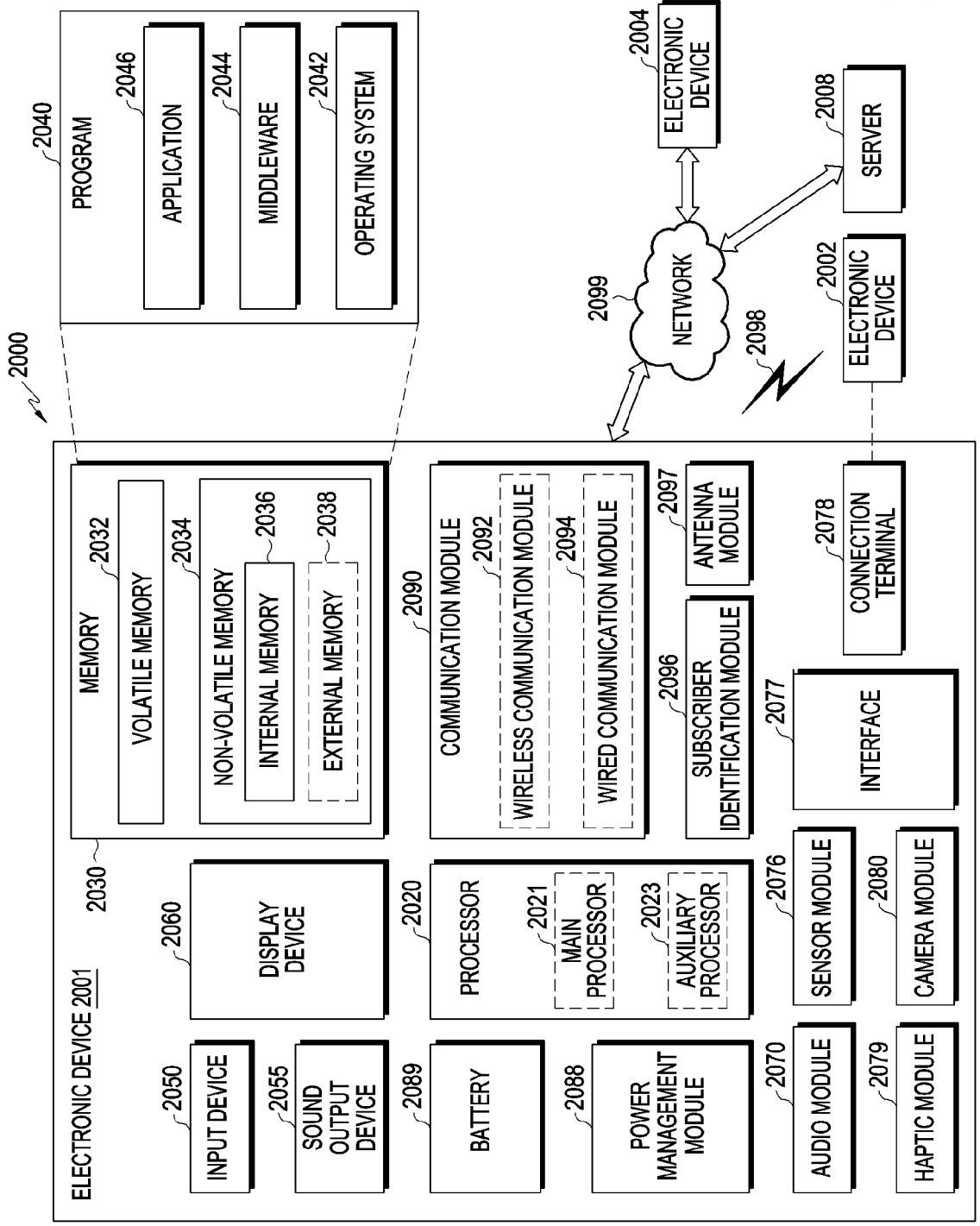
FIG. 20 is a diagram illustrating an electronic device in a network environment according to an embodiment of the disclosure.

FIG. 20 is a block diagram of an electronic device 2001 (e.g., the electronic device 100 of FIG. 1 and the electronic device 200 of FIG. 2) in a network environment 2000, according to various embodiments. Referring to FIG. 20, in the network environment 2000, the electronic device 2001 may communicate with an electronic device 2002 via a first network 2098 (e.g., short-range wireless communication), or may communicate with an electronic device 2004 or a server 2008 via a second network 2099 (e.g., long-distance wireless communication). According to an embodiment, the electronic device 2001 may communicate with the electronic device 2004 via the server 2008 (e.g., the first server 110 or the second server 120). According to an embodiment, the electronic device 2001 may include a processor 2020 (e.g., the processor 210 of FIG. 2), a memory 2030 (e.g., the memory 230 of FIG. 2), an input device 2050 (e.g., the input device 270 of FIG. 2), a sound output device 2055, a display device 2060, an audio module 2070, a sensor module 2076, an interface 2077, a haptic module 2079, a camera module 2080, a power management module 2088, a battery 2089, a communication module 2090 (e.g., the network interface 250 of FIG. 2), a subscriber identification module 2096 (e.g., the eUICC 220 of FIG. 2), and an antenna module 2097. According to an embodiment, in the electronic device 2001, at least one of the components (e.g., the display device 2060 or the camera module 2080) may be omitted, or other element may be added. According to some embodiments, for example, like a sensor module 2076 (e.g., a fingerprint sensor, an iris sensor, or an illumination sensor) embedded in the display 2060 (e.g., a display (e.g., the display 260 of FIG. 2)), some components may be integrated.

The processor 2020 may control at least one other component (e.g., hardware or software component) of the electronic device 2001 connected to the processor 2020 by operating software (e.g., the program 2040), and may perform various data processing and operation. The processor 2020 may load command or data received from another component (e.g., the sensor module 2076 or communication module 2090) to a volatile memory 2032, may process the same, and may store resultant data in a non-volatile memory 2034. According to an embodiment, the processor 2020 may include a main processor 2021 (e.g., a central processing device or an application processor) and a sub-processor 2023 (e.g., a graphic processing device, an image signaling processor, a sensor hub processor, or a communication processor) which operates independently from the main processor 2021, additionally or alternatively uses low power when compared to the main processor 2021, or is specific to a designated function. Here, the sub-processor 2023 may operate separately from the main processor 2021 or may operate by being embedded in the main processor 2021.

In this instance, the sub-processor 2023 may control at least some of the functions or states related to at least one component (e.g., a display device 2060, a sensor module 2076, or a communication module 2090) among the components of the electronic device 2001, on behalf of the main processor 2021 while the main processor 2021 is in inactive state (e.g., sleep), or together with the main processor 2021 while the main processor 2021 is in an active state (e.g., performing an application). According to an embodiment, the sub-processor 2023 (e.g., an image signal processor or a communication processor) may be implemented as a part of functionally related another component (e.g., a camera module 2080 or a communication module 2090). The memory 2030 may store various data used by at least one component (e.g., the processor 2020 or the sensor module 2076) of the electronic device 2001, for example, software (e.g., the program 2040) and input data or output data associated with commands related to the software. The memory 2030 may include the volatile memory 2032 or the non-volatile memory 2034.

The program 2040 may include software stored in the memory 2030, for example, an operating system 2042, a middleware 2044, or an application 2046.

The input device 2050 may be a device for receiving, from the outside (e.g., a user) of the electronic device 2001, commands or data to be used for components (e.g., the processor 2020) of the electronic device 2001, for example, a microphone, a mouse, or a keyboard.

The sound output device 2055 may be a device for outputting a sound signal to the outside of the electronic device 2001, and may include a speaker used for the general purpose such as multimedia reproduction or transcription playback, and a receiver dedicated to phone call reception. According to an embodiment, the receiver may be implemented separately or as being integrated with the speaker.

The display device 2060 is a device for visually providing information to the user of the electronic device 2001, and may include, for example, a display, a hologram device, or a projector, and a control circuit for controlling the corresponding device. According to an embodiment, the display device 2060 may include touch circuitry or a pressure sensor for measuring the strength of pressure on a touch.

The audio module 2070 may bilaterally convert sound and an electronic signal. According to an embodiment, the audio module 2070 may obtain sound via the input device 2050, or may output sound via the sound output device 2055 or an external electronic device (e.g., the electronic device 2002 (e.g., a speaker or headphone)) which is connected to the electronic device 2001 in a wired manner or wireless manner.

The sensor module 2076 may generate an electric signal or a data value corresponding to an internal operation state (e.g., the power or temperature) of the electronic device 2001 or an electric signal or a data value corresponding to the external environment state. The sensor module 2076 may include, for example, a gesture sensor, a gyro sensor, a pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 2077 may support a designated protocol which is connectable to an external electronic device (e.g., the electronic device 2002) in the wired manner or in the wireless manner. According to an embodiment, the interface 2077 may include a high definition multimedia interface (HDMI), a universal serial bus (USB) interface, an SD card interface, or an audio interface.

The connection terminal 2078 may include a connector which is capable of physically connecting the electronic device 2001 and an external electronic device (e.g., the electronic device 2002), for example, a HDMI connector, a USB connector, an SD card connector, or an audio connector (e.g., a headphone connector).

The haptic module 2079 may convert an electric signal into a mechanical stimulus (e.g., vibration or movement) or an electric stimulus which a user can recognize via a sense of touch or a movement sensation. The haptic module 2079 may include, for example, a motor, a piezoelectric device, or an electrostimulator.

The camera module 2080 may shoot a still image and a video. According to an embodiment, the camera module 2080 may include one or more lens, an image sensor, an image signal processor, or a flash.

The power management module 2088 is a module for managing power supplied to the electronic device 2001, and may be implemented as, for example, at least a part of a power management integrated circuit (PMIC).

The battery 2089 is a device for supplying power to at least one component of the electronic device 2001, and may include, for example, a primary battery which is disposable, a secondary battery which is rechargeable, or a fuel battery.

The communication module 2090 may establish a wired or wireless communication channel between the electronic device 2001 and an external electronic device (e.g., the electronic device 2002, the electronic device 2004, or the server 2008), and may support performing communication via the established communication channel. The communication module 2090 may include one or more communication processors which are operated independently from the processor 2020 (e.g., an application processor), and support wired communication or wireless communication. According to an embodiment, the communication module 2090 may include a wireless communication module 2092 (e.g., a cellular communication module, a short-range wireless communication module, a global navigation satellite system (GNSS) communication module) or a wired communication module 2094 (e.g., a local area network (LAN) communication module or a power line communication module), and may communicate with an external electronic device using a corresponding communication module via the first network 2098 (e.g., a short-range communication network, for example, Bluetooth, WiFi direct, or infrared data association (IrDA)) or the second network 2099 (e.g., a long-distance communication network, such as, a cellular network, the Internet, or a computer network (e.g., LAN or WAN)). The above-described various types of communication modules 2090 may be implemented as a single chip or may be implemented as different chips.

According to an embodiment, the wireless communication module 2092 may identify and authenticate the electronic device 2001 in a communication network using user information stored in the subscriber identification module 2096.

The antenna module 2097 may include one or more antennas for transmitting signals or power to the outside, or for receiving the same from the outside. According to an embodiment, the communication module 2090 (e.g., the wireless communication module 2092) may transmit a signal to the external electronic device or may receive a signal from the external electronic device, via an antenna appropriate for a communication scheme.

Some of the components may be connected with each other via an inter-peripheral device communication scheme (e.g., a bus, a general purpose input/output (GPIO), a serial peripheral interface (SPI), or a mobile industry processor interface (MIPI)), and may mutually exchange signals (e.g., commands or data).

According to an embodiment, transmission or reception of commands or data may be performed between the electronic device 2001 and the external electronic device 2004 via the server 2008 connected to the second network 2099. The electronic devices 2002 and 104 may be the devices of the type which is the same as, or different, from the type of the electronic device 2001. According to an embodiment, some or all of the operations executed by the electronic device 2001 may be performed by an external electronic device or a plurality of external electronic devices. According to an embodiment of the disclosure, when the electronic device 2001 has to perform some functions or services automatically or by request, the electronic device 2001 may request an external electronic device to perform at least some functions relating thereto instead of, or in addition to, performing the functions or services by itself. An external electronic device that receives the request may execute the requested functions or additional functions, and may transfer the result thereof to the electronic device 2001. The electronic device 2001 may provide the received result as it is, or may additionally process the received result to provide the requested functions or services. To this end, for example, cloud computing, distributed computing, or client-server computing technology may be used.

Figure 21:
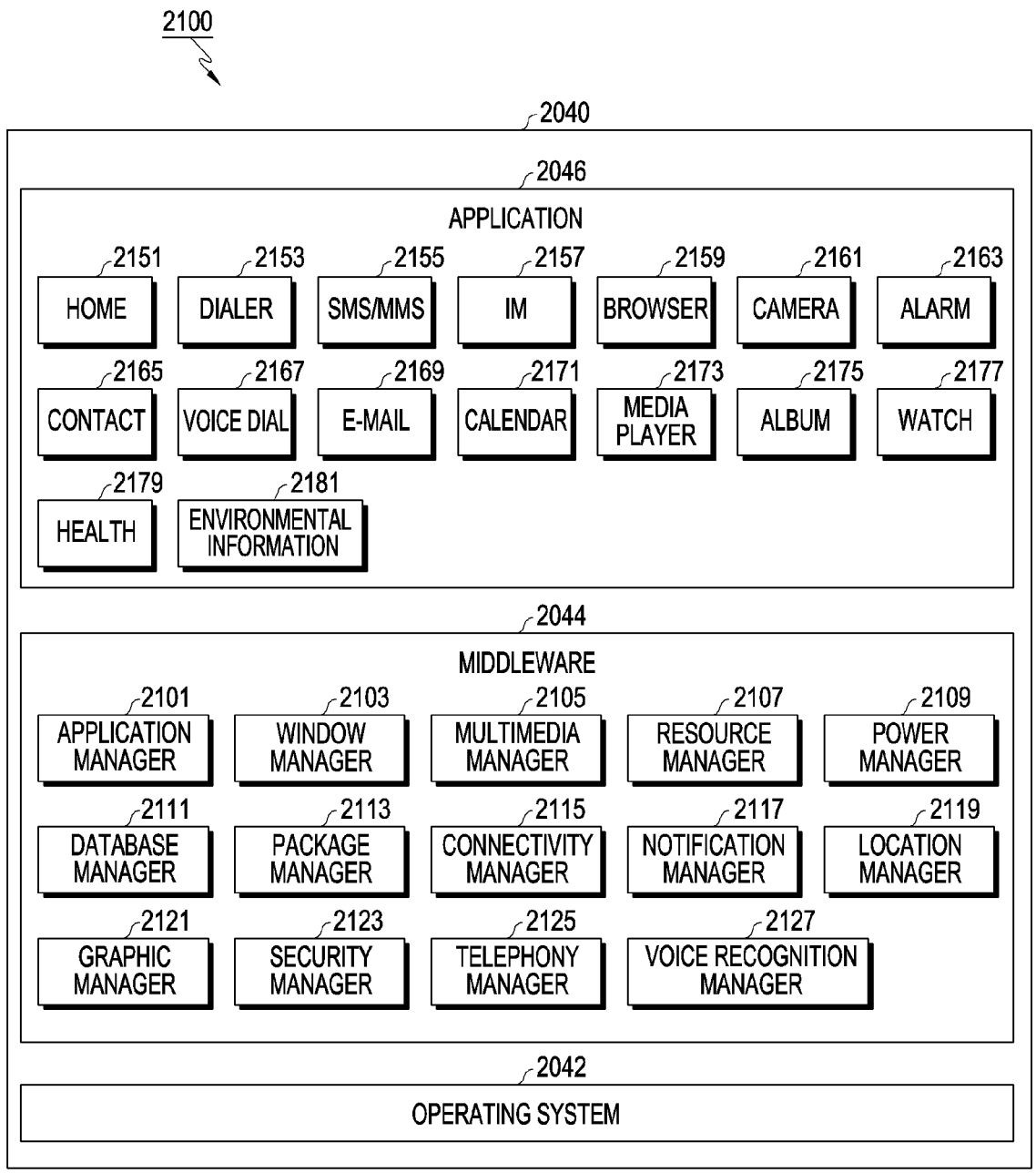
FIG. 21 is a block diagram of a detailed structure of a program module of an electronic device according to an embodiment of the disclosure.

FIG. 21 is a block diagram 2100 of a program 2040 according to various embodiments. According to an embodiment, the program 2040 may include an operating system 2042 for controlling one or more resources of the electronic device 2001, middleware 2044, or applications 2046 executable on the operating system 2042. The operating system 2042 may include, for example, Android™, iOS™, Windows™, Symbian™, Tizen™, or Bada™. At least some of the program 2040 may be preloaded in the electronic device 2001 during, for example, a manufacturing process, or may be downloaded from, or updated by, an external electronic device (e.g., the electronic device 2002 or 104, or the server 2008) in the user environment.

The operating system 2042 may control (e.g., allocate or retrieve) system resources (e.g., a process, a memory, or a power source) of the electronic device 2001. Additionally or alternatively, the operating system 2042 may include one or more driver programs for driving another hardware device of the electronic device 2001, for example, the input device 2050, the sound output device 2055, the display device 2060, the audio module 2070, the sensor module 2076, the interface 2077, the haptic module 2079, the camera module 2080, the power management module 2088, the battery 2089, the communication module 2090, the subscriber identification module 2096, or the antenna module 2097.

The middleware 2044 may provide various functions to the applications 2046 so that the applications 2046 are capable of using functions or information provided by one or more resources of the electronic device 2001. The middleware 2044 may include, for example, an application manager 2101, a window manager 2103, a multimedia manager 2105, a resource manager 2107, a power manager 2109, a database manager 2111, a package manager 2113, a connectivity manager 2115, a notification manager 2117, a location manager 2119, a graphic manager 2121, a security manager 2123, a telephony manager 2125, or a voice recognition manager 2127. The application manager 2101 may manage, for example, the life cycle of the applications 2046. The window manager 2103 may manage, for example, GUI resources used for a screen. The multimedia manager 2105 may identify formats required for reproducing various media files and may encode or decode a media file using a codec suitable for the corresponding format. The resource manager 2107 may manage, for example, the source code of the applications 2046 or the space in memory. The power manager 2109 may manage, for example, battery capacity, temperature, or power, and may determine or provide power information required for the operation of the electronic device 2001 on the basis of corresponding information. According to an embodiment, the power manager 2109 may interoperate with a basic input/output system (BIOS).

The database manager 2111 may, for example, generate, search for, or change databases to be used by the applications 2046. The package manager 2113 may manage, for example, installation or updating of an application distributed in the form of a package file. The connectivity manager 2115 may manage, for example, a wireless connection or a wired connection between the electronic device 2001 and an external electronic device. The notification manager 2117 may provide, for example, a function of informing a user of an event that has occurred (e.g., a call, a message, or an alarm). The location manager 2119 may manage, for example, the location information of the electronic device 2001. The graphic manager 2121 may manage a graphic effect to be provided to a user and a user interface relating to the graphic effect. The security manager 2123 may provide, for example, system security or user authentication. The telephony manager 2125 may manage, for example, the voice call or video call function of the electronic device 2001. The voice recognition manager 2127 may transmit, for example, user's voice data to the server 2008, and may receive a command corresponding to a function to be performed in the electronic device 2001 on the basis of the voice data, or text data converted on the basis of the voice data. According to an embodiment, the middleware 2144 may dynamically remove some of the existing components, or may add new components. According to an embodiment, at least a part of the middleware 2044 may be included as a part of the operating system 2042, or may be implemented as software separate from the operating system 2042.

The applications 2046 may include, for example, a home application 2151, a dialer application 2153, an SMS/MMS application 2155, an instant messaging (IM) application 2157, a browser application 2159, a camera application 2161, an alarm application 2163, a contact application 2165, a voice recognition application 2167, an email application 2169, a calendar application 2171, a media player application 2173, an album application 2175, a watch application 2177, a healthcare application (e.g., measuring exercise quantity or blood glucose), or an application providing environmental information (e.g., atmospheric pressure, humidity, or temperature information). According to an embodiment, the applications 2046 may further include an information exchange application (not illustrated) capable of supporting exchange of information between the electronic device 2001 and an external electronic device. The information exchange application may include, for example, a notification relay application for relaying predetermined information (e.g., a call, a message, or an alarm) to an external electronic device, or a device management application for managing an external electronic device. The notification relay application may transfer, to an external electronic device, notification information corresponding to an event (e.g., receiving a mail) occurring in another application (e.g., an e-mail application 2169) of the electronic device 2001, or may receive notification information from an external electronic device and may transmit the same to the user of the electronic device 2001. The device management application may control, for example, the power (turning on or turning off) or the functions (the brightness, resolution, or focus of the display device 2060 or the camera module 2080) of an external electronic device that communicates with the electronic device 2001 or some components (e.g., the display device 2060 or the camera module 2080) thereof. Additionally or alternatively, the device management application may support installation, deletion, or updating an application that operates in an external electronic device.

An electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. According to an embodiment, the electronic devices are not limited to those described above.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B", "one or more of A and/or B", "A, B, or C", or "one or more of A, B and/or C" may include all possible combinations of them. The expression "a first", "a second", "the first", or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit including hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments disclosed herein may be implemented by software (e.g., program 2040) including an instruction stored in machine-readable storage media (e.g., internal memory 2036 or external memory 2038). The machine is a device that calls the stored instruction from the storage media and can operate according to the called instruction, and may include an electronic device (e.g., electronic device 2001) according to the disclosed embodiments. The instruction, when executed by a processor (e.g., processor 2020), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™. If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

An electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. According to an embodiment, the electronic devices are not limited to those described above.

The term "module" as used herein may include a unit including hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments disclosed herein may be implemented by software (e.g., program 2040) including an instruction stored in machine-readable storage media (e.g., internal memory 2036 or external memory 2038). The machine is a device that calls the stored instruction from the storage media and can operate according to the called instruction, and may include an electronic device (e.g., electronic device 2001) according to the disclosed embodiments. The instruction, when executed by a processor (e.g., processor 2020), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™. If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

According to various embodiments, a storage medium stores instructions, and when the instructions are executed by at least one processor, the instructions are configured to enable the at least one processor to perform at least one operation, the at least one operation may include: determining whether subscriber identification information stored in a subscriber identification module embedded in an electronic device is shared subscriber identification information which is usable by accessing a communication service provision server; transmitting the shared subscriber identification information to a first server, via at least one communication service provision server to which the electronic device is connectable from among a plurality of communication service provision servers; receiving, from the first server, access information associated with a second server that provides a provisioning profile in response to the transmission of the shared subscriber identification information; and requesting the provisioning profile from the second server, on the basis of the received access information associated with the second server.

The embodiments of the disclosure disclosed in the specification and the drawings are only particular examples proposed in order to easily describe the technical matters of the disclosure and help with comprehension of the disclosure, and do not limit the scope of the disclosure. Therefore, in addition to the embodiments disclosed herein, the scope of the various embodiments of the disclosure should be construed to include all modifications or modified forms drawn based on the technical idea of the various embodiments of the disclosure.

What is claimed is:

1. An electronic device, comprising:
a display;
a network interface;

an embedded subscriber identification module configured to store shared subscriber identification information which is usable by accessing at least one communication service provision server;

a processor electrically connected to the network interface; and a memory electrically connected to the processor, wherein the memory comprises instructions that are configured to, when executed, enable the processor to:

identify the shared subscriber identification information stored in the embedded subscriber identification module;

control the display to display at least one communication service provision server to which the electronic device is connectable from among a plurality of communication service provision servers which store the shared subscriber identification information;

in response to receiving a first user input for selecting a communication service provision server from among the at least one communication service provision server in a state that a provisioning profile is not received, transmit the identified shared subscriber identification information to a first server via the selected communication service provision server;

receive access information associated with a second server that provides the provisioning profile, from the first server, in response to the transmission of the shared subscriber identification information;

request the provisioning profile from the second server, on the basis of the received access information associated with the second server;

receive the provisioning profile from the second server;

control the display to display a list of at least one operational profile received from a third server based on execution of the received provisioning profile;

in response to receiving a second user input for selecting a profile item from among the list of the at least one operational profile, request an operational profile corresponding to the selected profile item from a specific server that stores the operational profile; and download the operational profile corresponding to the selected profile item from the specific server, wherein the selected communication service provision server, the first server, the second server, and the third server are different from each other.

2. The electronic device of claim 1, wherein the instructions are configured to enable the processor to further receive event identification information corresponding to the provisioning profile from the first server, and to transmit, to the second server, the event identification information received from the first server so as to request the provisioning profile.

3. The electronic device of claim 1, wherein the instructions are configured to enable the processor to perform mutual authentication with the first server.

4. The electronic device of claim 1, wherein the instructions are configured to enable the processor to assign a priority to a profile corresponding to a communication service provision server to which the electronic device connects first, from among the at least one profile.

5. A method of remotely providing a profile to an electronic device comprising a display, the method comprising:

determining whether subscriber identification information stored in a subscriber identification module embedded in the electronic device is shared subscriber identification information which is usable by accessing a communication service provision server;

controlling the display to display at least one communication service provision server to which the electronic device is connectable from among a plurality of communication service provision servers which store the shared subscriber identification information;

in response to receiving a first user input for selecting a communication service provision server from among the at least one communication service provision server in a state that a provisioning profile is not received, transmitting the shared subscriber identification information to a first server, via the selected communication service provision server;

receiving, from the first server, access information associated with a second server that provides the provisioning profile, in response to the transmission of the shared subscriber identification information;

requesting the provisioning profile from the second server, on the basis of the received access information associated with the second server;

receive the provisioning profile from the second server;

control the display to display a list of at least one operational profile received from a third server based on execution of the received provisioning profile;

in response to receiving a second user input for selecting a profile item from among the list of the at least one operational profile, request an operational profile corresponding to the selected profile item from a specific server that stores the operational profile; and download the operational profile corresponding to the selected profile item from the specific server, wherein the selected communication service provision server, the first server, the second server, and the third server are different from each other.

6. The method of claim 5, further comprising:

receiving event identification information corresponding to the provisioning profile from the first server; and transmitting, to the second server, the event identification information received from the first server, so as to request the provisioning profile.

7. The method of claim 5, wherein the electronic device performs mutual authentication with the first server.

* * * * *